US011279250B2

(12) United States Patent
North et al.

(10) Patent No.: US 11,279,250 B2
(45) Date of Patent: Mar. 22, 2022

(54) ELECTRIC SCOOTER DOCKING STATIONS

(71) Applicant: Neptune Scooters, San Carlos, CA (US)

(72) Inventors: Forrest Jean North, Redwood City, CA (US); Javier Gonzalez Carracelas, Aachen (DE); Ricardo Abdiel Mora Gonzalez, Redwood City, CA (US); Steven Thomas Snyder, Los Angeles, CA (US); Michelle Valerie Carlomusto, Los Angeles, CA (US); Justin David Almeleh, Los Angeles, CA (US); Matthew Coleman Tindall, Los Angeles, CA (US); Ana Gabriela Costilla Gonzalez, San Carlos, CA (US); Federico Vorrath Sepúlveda, San Carlos, CA (US); Ernesto Alejandro Cantu Zamarrón, San Carlos, CA (US); David Osman Doluca, San Carlos, CA (US); Erik Daryl Aylen, San Carlos, CA (US); Kyle Allen Hartelt, San Carlos, CA (US)

(73) Assignee: NEPTUNE SCOOTERS, San Carlos, CA (US)

( * ) Notice: Subject to any disclaimer, the term of this patent is extended or adjusted under 35 U.S.C. 154(b) by 0 days.

(21) Appl. No.: 16/994,162

(22) Filed: Aug. 14, 2020

(65) Prior Publication Data

US 2021/0046835 A1 Feb. 18, 2021

Related U.S. Application Data

(60) Provisional application No. 62/888,316, filed on Aug. 16, 2019, provisional application No. 62/993,912, filed on Mar. 24, 2020.

(51) Int. Cl.
*B60L 53/30* (2019.01)
*B60L 53/14* (2019.01)
*B60L 50/60* (2019.01)

(52) U.S. Cl.
CPC ............... *B60L 53/30* (2019.02); *B60L 50/66* (2019.02); *B60L 53/14* (2019.02)

(58) Field of Classification Search
CPC .......... B60L 53/30; B60L 50/66; B60L 53/14
(Continued)

(56) References Cited

U.S. PATENT DOCUMENTS 9,418,345 B1 * 8/2016 Meehan et al. ......... B60L 53/66
9,873,976 B2 * 1/2018 Al Jaj Eid et al. ..... D06F 95/00
(Continued)

FOREIGN PATENT DOCUMENTS

EP 2639144 A1 9/2013
JP 4531321 B2 8/2010
(Continued)

OTHER PUBLICATIONS

International Search Report and Written Opinion dated Nov. 24, 2020 for International Patent Application No. PCT/US2020/046475.

*Primary Examiner* — Sun J Lin
(74) *Attorney, Agent, or Firm* — AMPACC Law Group, PLLC

(57) ABSTRACT

Various electric scooter docking stations are described herein. In some embodiments, the electric scooter docking stations facilitate collection, movement, and/or storage of the electric scooters in a compact, elegant, and efficient configuration. For example, the electric scooter docking stations can be configured to take advantage of a unique shape of an electric scooter, providing the storage and positioning of many electric scooters in a compact area.

(Continued)

Also, the electric scooter docking stations can be simple structures that facilitate self-powered movement of electric scooters within the electric scooter docking stations.

15 Claims, 35 Drawing Sheets

(58) Field of Classification Search
USPC .......................................................... 320/109
See application file for complete search history.

(56) References Cited

U.S. PATENT DOCUMENTS

| | | | |
|---|---|---|---|
| 10,919,405 B2* | 2/2021 | Moravick et al. | H02J 7/0013 |
| 10,946,758 B2* | 3/2021 | Moravick et al. | H02J 7/0044 |
| 10,974,782 B2* | 4/2021 | Foley | B62J 50/225 |
| D924,107 S * | 7/2021 | Greenblatt | D12/115 |
| 11,110,981 B2* | 9/2021 | Chadwick et al. | G06Q 30/0645 |
| 2019/0263281 A1* | 8/2019 | Wang | B62K 3/002 |

FOREIGN PATENT DOCUMENTS

| | | |
|---|---|---|
| KR | 10-0959805 B1 | 5/2010 |
| KR | 20130021754 A | 3/2013 |
| WO | WO2017217929 A1 | 12/2017 |

* cited by examiner

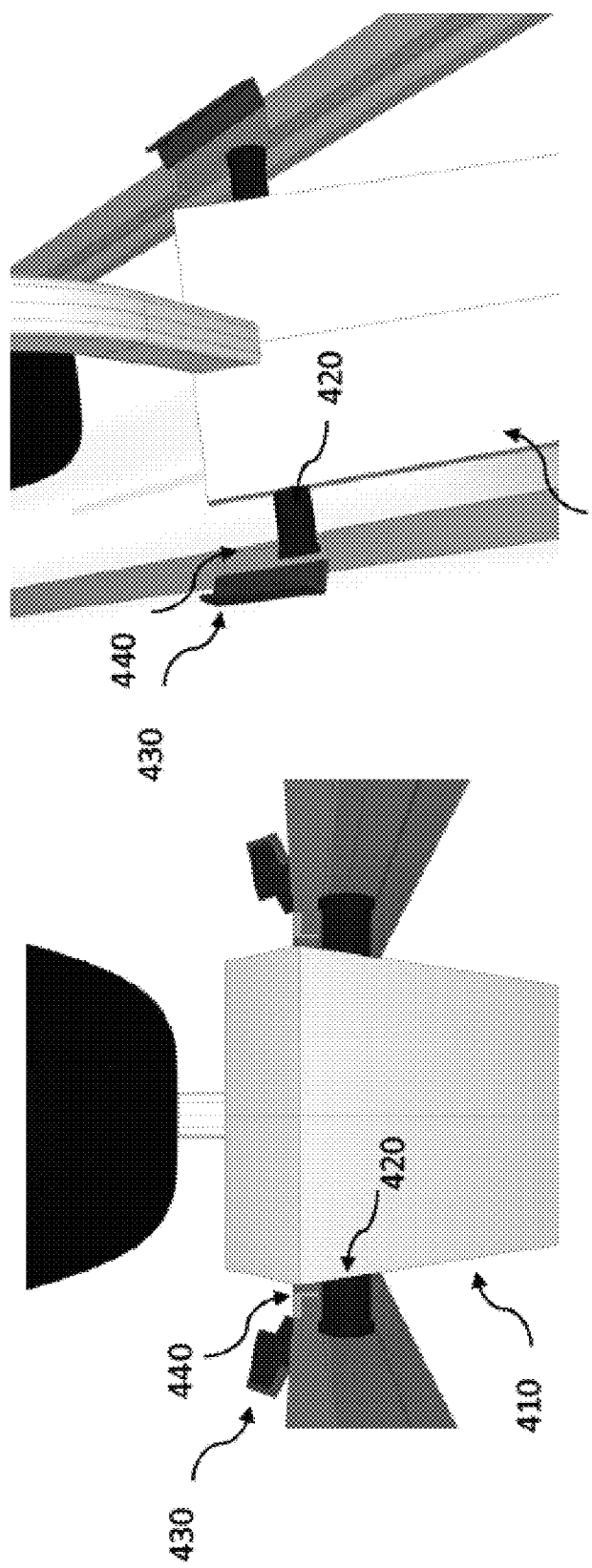

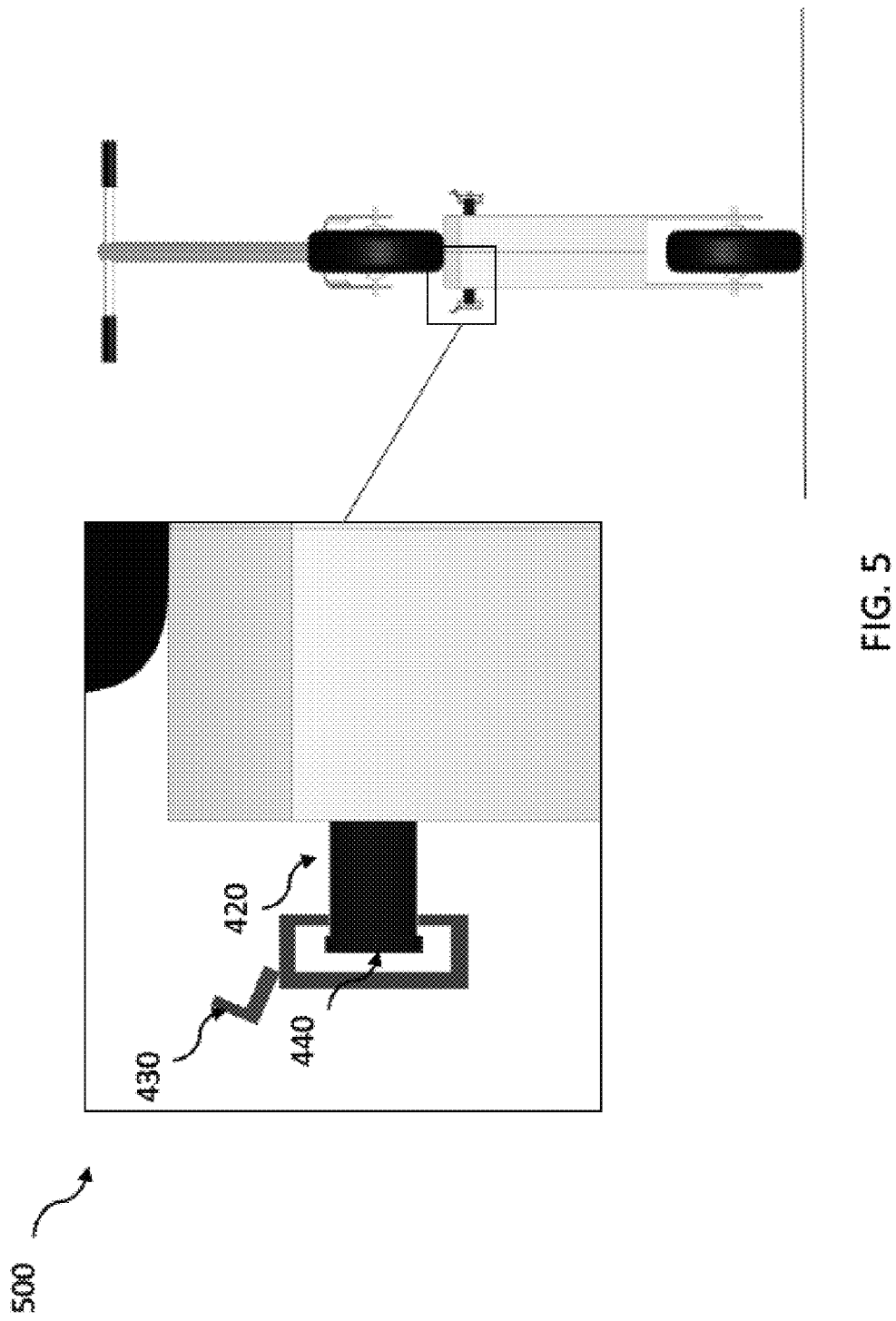

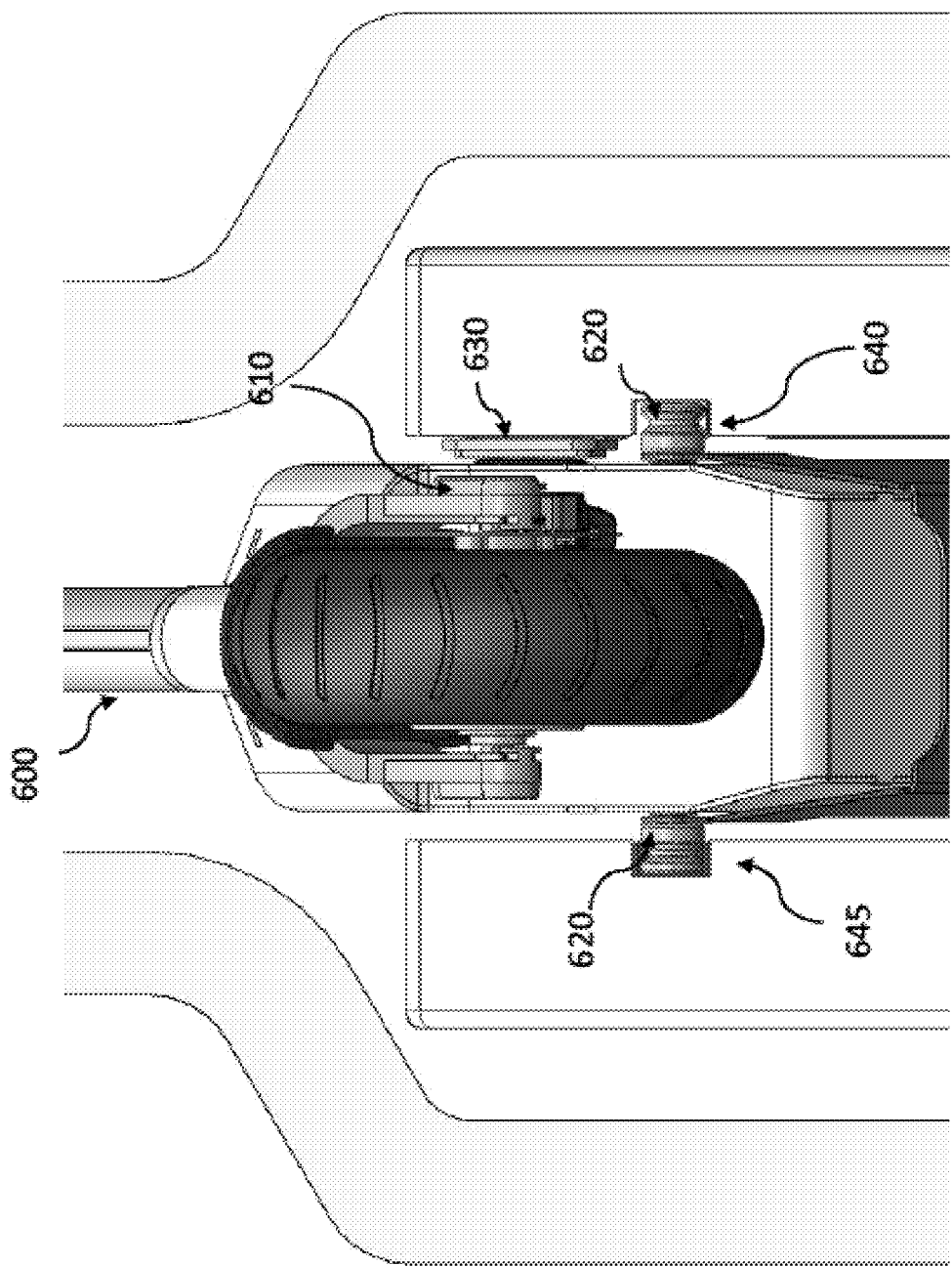

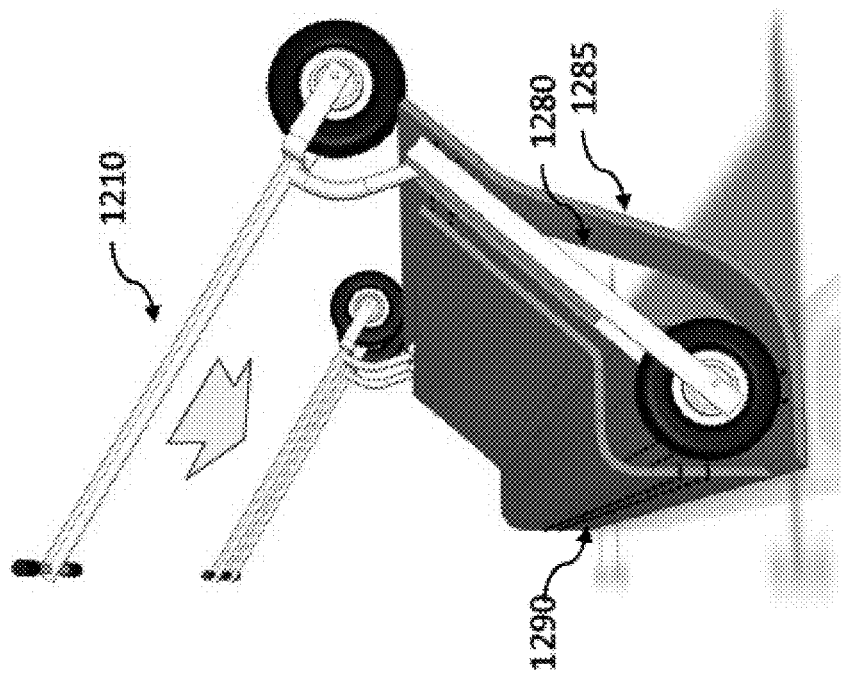
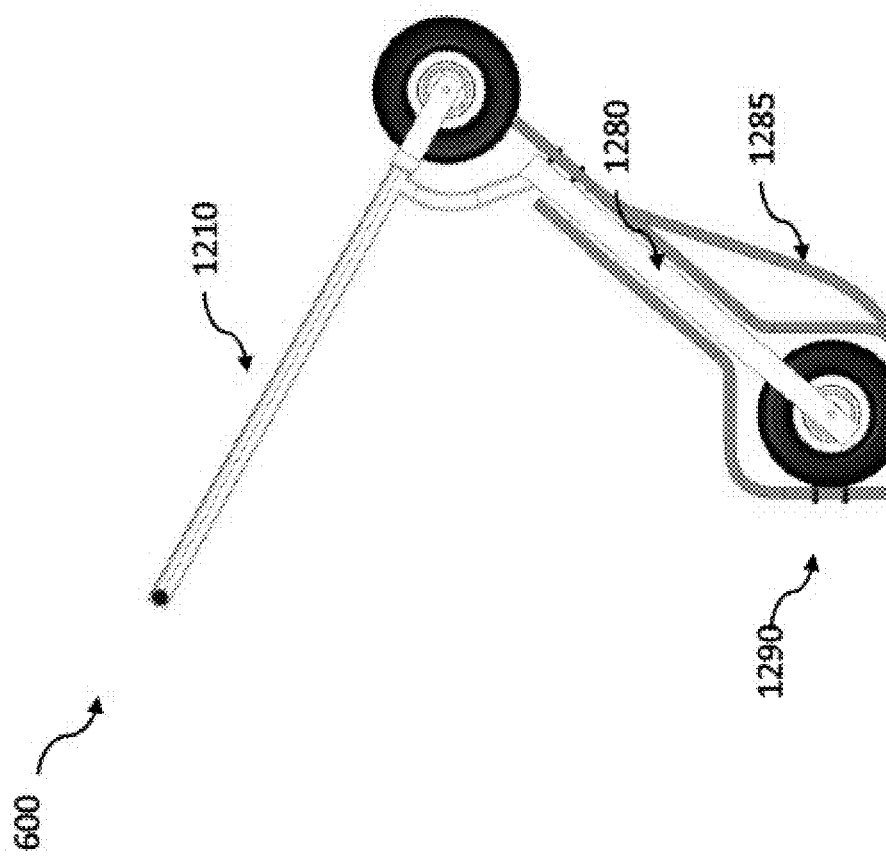
FIG. 12C

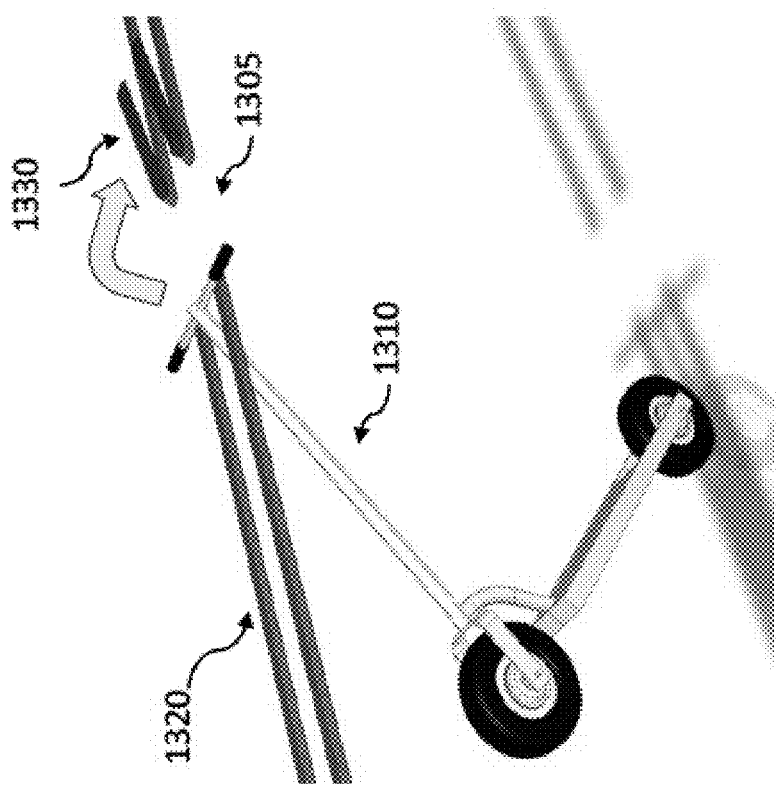
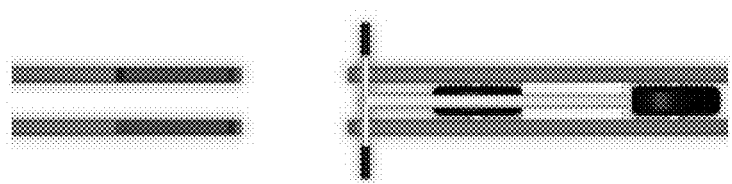
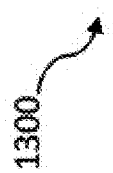
FIG. 13B

ELECTRIC SCOOTER DOCKING STATIONS

CROSS REFERENCE TO RELATED APPLICATIONS

This application claims priority to U.S. Provisional Patent Application No. 62/888,316, filed on Aug. 16, 2019, entitled ELECTRIC SCOOTER DOCKING STATIONS, and U.S. Provisional Patent Application No. 62/993,912, filed on Mar. 24, 2020, entitled ELECTRIC SCOOTERS AND ASSOCIATED SYSTEMS, both of which are incorporated by reference in their entirety.

BACKGROUND

There are many ways to get around a city. A person can walk, drive, travel by bus, tram, subway, taxi, or hire a car share service. A person can also rent or use various individual modes of transportation, such as mopeds, bikes (e.g., e-bikes or ebikes), scooters, skateboards (electric skateboards) and/or other micromobility vehicles or devices. For example, many cities provide residents and visitors with bike share and scooter share services, such as services that enable people to rent bikes or electric scooters when traveling short distances within a city.

While these services provide people with numerous benefits, current installations and provisioning of bike and scooter shares suffer from various drawbacks. For example, services that provide the docking of bikes can take up a large footprint within a city or neighborhood, such as in areas where any extra space can be utilized for parking, footpaths, and so on. As another example, services that provide dockless bikes and scooters enable users to simply leave their rented bikes and scooters in the middle of sidewalks, in yards, and other undesirable locations. Further, the vehicles are often stolen or broken.

These and other drawbacks exist with respect to current electric scooter share services.

BRIEF DESCRIPTION OF THE DRAWINGS

FIGS. 4A-4C are diagrams illustrating contact components between an electric scooter and an electric scooter docking station.

FIG. 5 is a diagram illustrating an electric scooter with electrical and/or mechanical contact components.

FIGS. 6A-6D are diagrams illustrating components configured to de-couple the electrical and/or mechanical components of an electric scooter to a docking station.

FIGS. 12A-12C are diagrams illustrating an electric scooter docking station having a sideways storage configuration.

FIGS. 13A-13D are diagrams illustrating a method and apparatus for removing a scooter from a docking station.

Figure 1A:
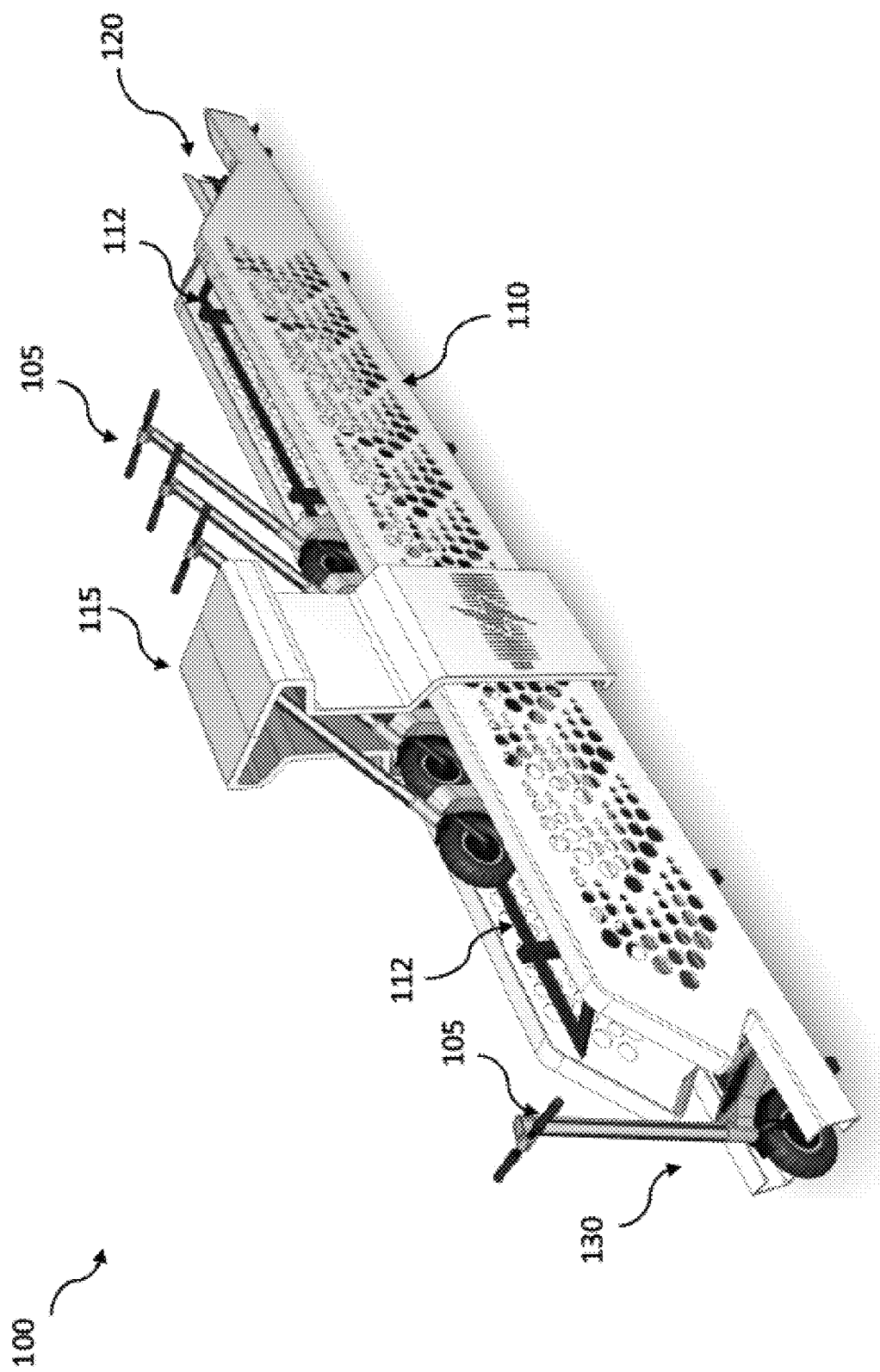
FIGS. 1A-1B are diagrams illustrating an electric scooter docking station.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Various electric scooter docking stations are described herein. In some embodiments, the docking stations facilitate the collection, movement, and/or storage of electric scooters in a compact, elegant, and efficient configuration. For example, the docking stations can be configured to take advantage of the unique shape of a scooter, providing the storage and positioning of many scooters in a compact area. Also, the docking stations can be simple structures that facilitate the self-powered movement of electric scooters within a station.

Thus, in various implementations, the docking stations described herein are designed to enable self-propelled movement and docking of electric scooters within a station, while also recharging the scooters within the station. A docking station can also facilitate simple and efficient collection and entry of scooters into the station, as well as simple and efficient extraction or dispensing of scooters from the station.

For example, an electric scooter docking station, which dispenses electric scooters to users of a scooter share service, can include an upper channel configured to receive a front wheel of an electric scooter and a lower channel configured to receive a rear wheel of the electric scooter, where the upper channel is positioned with respect to the lower channel in a configuration that stores electric scooters within the docking station at an angle with respect to the ground. Further, one or both of the channels can include a charging rail that contacts a charging port of the electric scooter when the scooter is docked within the apparatus and provides charge to an electric battery of the electric scooter.

In some cases, the charging port is part of a guiding peg or post of the electric scooter. The guiding peg can have a shape that facilitates being disposed within the channels (or rails), such that the scooter, when moving through the docking station, does not move (or is somewhat restricted from moving) laterally within the station, and thus maintains contact with the charging rail. In other cases, the charging port is a separate component (e.g., a contact pad distinct from any guiding peg or post) that contacts rolling or other contacts of the docking station in order to transfer charge between the docking station and the electric scooter.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of Electric Scooter Docking Stations

Several implementations of the docking stations are discussed below in more detail with reference to the figures. However, a docking station, as described herein, can include one or more rails to facilitate collection of scooters, as well as the movement of scooters into, within, and out of a docking station. Further, a docking station includes a charging connector or other similar component which, when contacted by a similar component of a scooter (e.g., a charging port integrated with the scooter), charges an electric battery of the scooter when docked or contained in the docking station.

The docking station can also include various computing systems, such as a computing system that performs various actions, method, and/or techniques associated with scooters within or external to a docking station. The computing systems can interact with various external or networked computing systems, such as systems provided by remote or cloud services or locations. Further, the computing system of a docking station can wirelessly communicate with one or more docked electric scooters over various protocols, including Wi-Fi, Bluetooth, and other wireless protocols, near field communication protocols (such as when a scooter is docked), and so on.

Also, in some embodiments, communications between the docking stations and various components (or associated scooters) may be performed over wired connections, including various power lines or connections. Further, as described herein, in some cases, the docking stations can be simple structures that are configured to docking and store electric scooters, but provide no power, charging, or communications functions for the electric scooters themselves.

Further, an electric scooter, as described herein, is generally a powered stand-up scooter, propelled by an electric motor. Electric scooters can also be referred to as electric kick scooters, e-scooters, motorized scooters, and so on. Typically, an electric scooter includes two small wheels (e.g., hard or solid tires, air tires, foam filled tires), a foldable or non-foldable steering tube, a chassis having a deck to stand on, a down tube connected to the head tube inside of which turns the steering tube connected to a stem attached to handlebars. In addition, the electric scooter can include fenders, trailer hitches, brakes, lights, and other accessories or components.

The components of an electric scooter can include a transmission or drive system, a control system, a braking system, a suspension, a battery, and an electric motor. The electric scooter may also include various computing systems and components, such as the various computing systems described herein, GPS or positioning systems, communication components, and so on. For example, an electric scooter can include computing systems and identification components that facilitate or enable the electric scooter as an Internet of Things (e.g., IoT) device networked to other scooters and one or more control or communication systems.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

As described herein, the technology includes various docking station apparatuses and configurations. While depicted herein as different version of a docking station, in some embodiments, components from different versions may be integrated together to realize other configurations for docking electric scooters. As an example, FIGS. 1 and 4A-4C depict a first version of an electric scooter docking station 100.

Figure 1B:
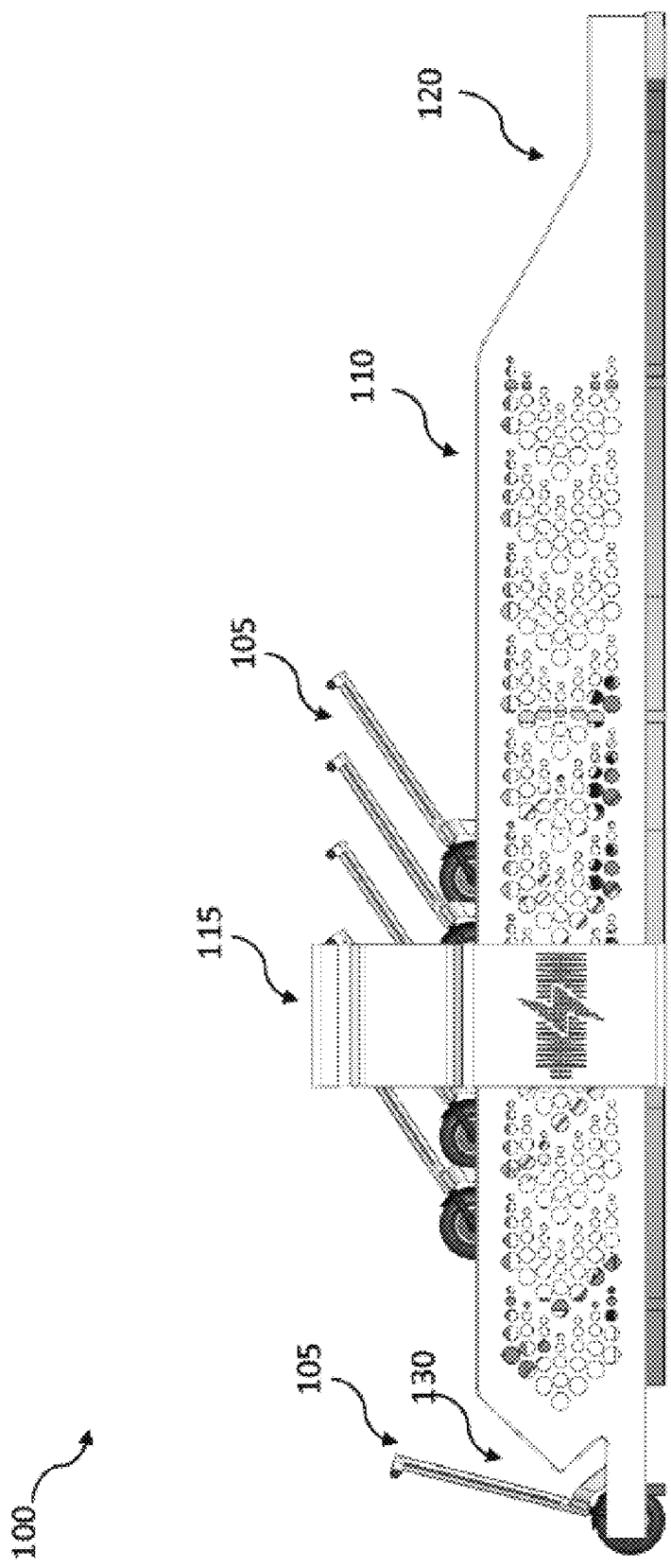

FIGS. 1A-1B are diagrams illustrating an electric scooter docking station 100. The docking station 100 includes a housing 110 configured to dock, store, or contain electric scooters 105. For example, as will be described herein, the housing 110 includes rails, channels, or other support components 112 configured to store multiple scooters at an angle with respect to the ground, such as at an angle that is 30-60 degrees from a horizontal axis defined by the ground.

The docking station 100 includes an entry section 120, which receives the electric scooters 105 into the docking station 100, as well as an exit section 130, which facilitates the exit or dispensing of the electric scooters 105 from the docking station 100. For example, the exit section 130 can be configured in various geometries (e.g., a Z-shape, as described herein) in order to guide the docked scooters 105 from the angled, docked, position to a horizontal position (e.g., the position via which the scooters 105 enter the docking station 100) when dispensed to a user from the docking station 100.

The docking station 100 can include other components, as described herein, including components that facilitate the receipt of payment information, user information, or other information communicated to the docking station 100 from a user. Further, given the use of electric scooters 105 by many different users, the docking station 100 can include sanitation or cleaning components 115.

For example, the docking station 100 can include various sanitization or cleansing facilities or areas. The docking station 100 can include an area or component where scooter handles pass through (e.g., either at the beginning or end of the station), and disinfect or clean the handles with mechanical, chemical and/or UV light before the next person uses the scooter. The docking station 100 can also use similar components when dispending helmets or other shared equipment.

Figure 2A:
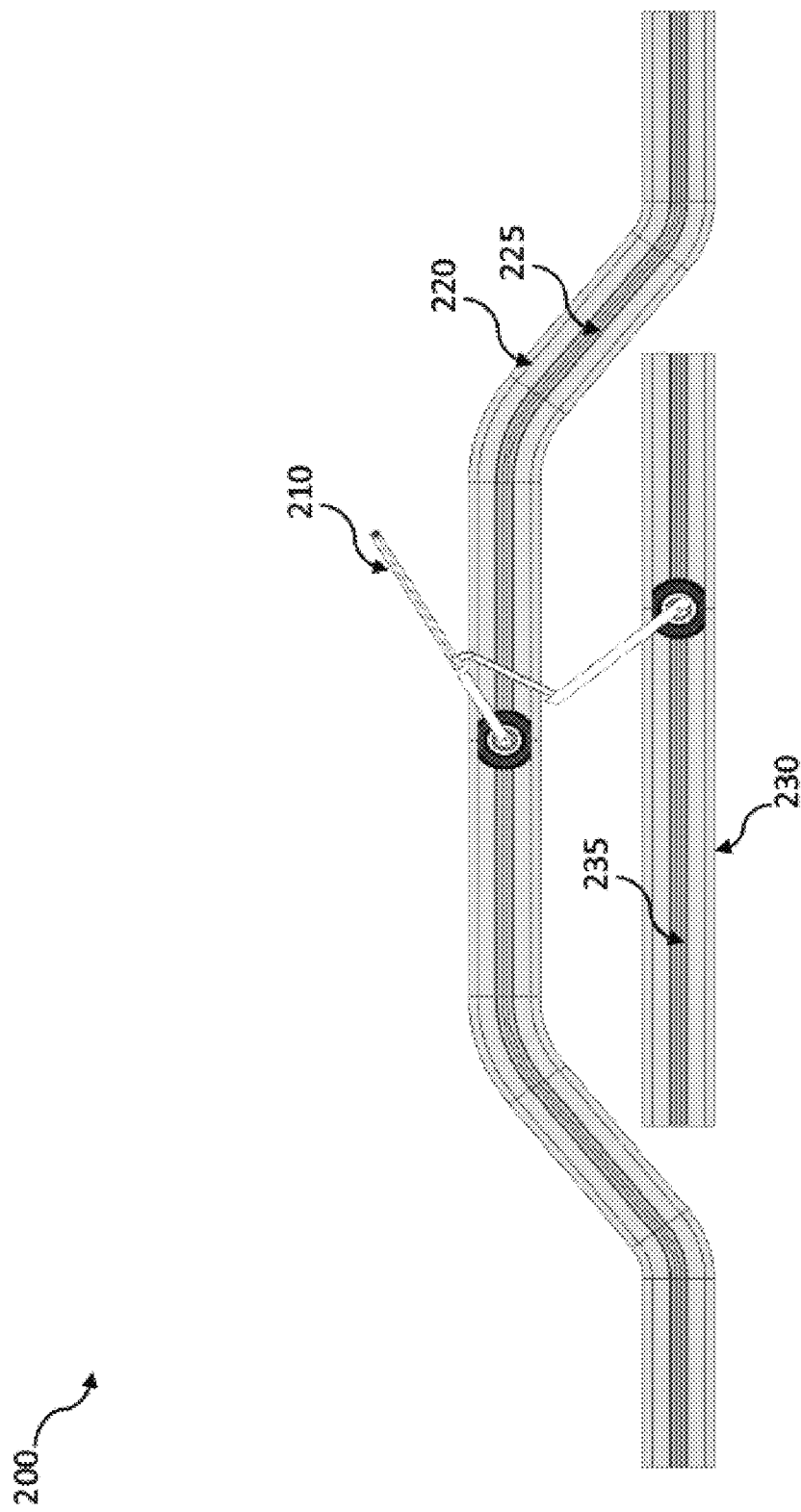
FIGS. 2A-2D are diagrams illustrating an electric scooter docked within the electric scooter docking station.
Figure 2B:
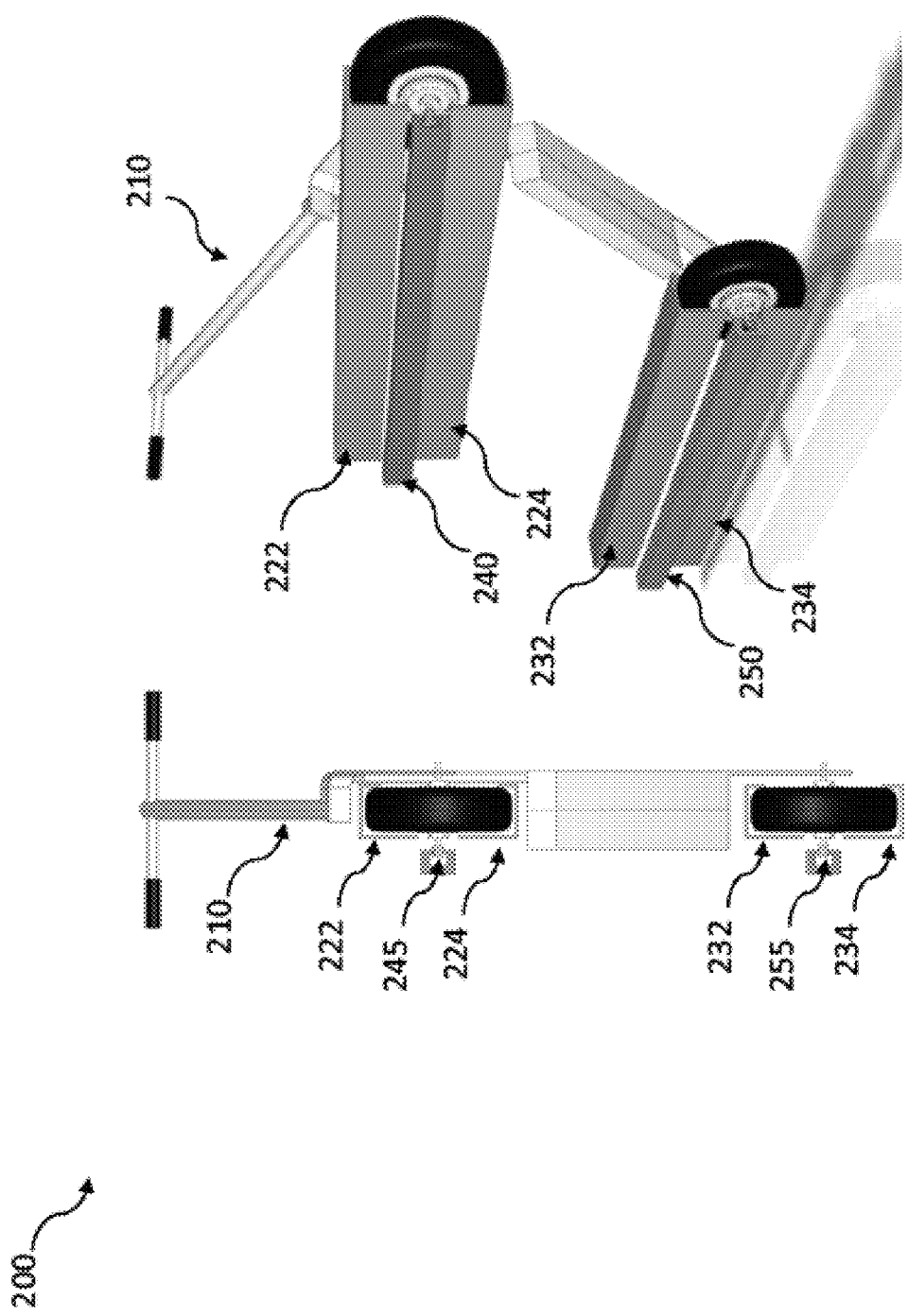

FIGS. 2A-2B are diagrams illustrating an electric scooter docked within an electric scooter docking station.

As shown in FIG. 2A, the docking station 200 stores an electric scooter 210 docked within the station 200. The station 200 includes a front wheel channel 220, which receives a front wheel of the scooter 210. The docking station 200 also includes a rear wheel channel 230, which receives a rear wheel of the scooter 210. The configuration of the channels 220, 230 (or, alternatively, rails) causes the front wheel of the scooter 210 to lift up and sit in an elevated position within the station 200 and when advancing through the station 200 (e.g., from an entry to an exit of the station 200). Thus, the electric scooter 210 is docked within the docking station 200 at an angle with respect to the ground.

The raised position can optimize the available space within the docking station 200, as the station can facilitate many scooters per linear foot (with respect to positioning scooters end to end). In some embodiments, various different combinations and/or geometries of lower and/or upper channels (e.g., real wheel and/or front wheel channels) enable the efficiency and/or optimization of storage of scooters. For example, the station may include only the upper channel 220, the lower channel 230, or a combination of both channels. Further, in some cases only certain sections or portions of a station include channels that receive scooters and/or wheels of scooters.

The channels can receive the electric scooter 210 such that scooter propels itself within the station 100 (e.g., via the channels 220, 230) via its electric motors, as the channels (or rails) ensure the lateral stability of the scooter 210 as the scooter 210 moves within the docking station 200. Further, the configuration of the channels or rails, such as via ramps or other undulations, are designed to control the speed and/or movement of the scooter 210 as it traverses the station 200.

In some embodiments, the docking station 200 includes a battery charging component for adapted scooters (e.g., scooters with contactable charging ports). The station 200 can include a charging channel, connector, or component. For example, the front wheel channel 220 can include a charging connector 225, and the rear wheel channel 230 can include a charging connector 235. In some cases, the station 200 includes one charging connector or rail, which charges a battery of the scooter 210 when in contact with a charging port (e.g., a port near a wheel hub of the scooter 210) of the scooter 210.

FIG. 2B depicts additional details of the docking station 200. The front wheel channel 220 includes a front wheel channel upper component 227, a front wheel channel lower component 224, and a front wheel channel charging connector 240, which is positioned to make contact with a scooter charging port 245 when the scooter 210 is docked within the station 100.

The rear wheel channel 230 includes a real wheel channel upper component 232, a rear wheel channel lower component 234, and a rear wheel channel charging connector 250, which is positioned to make contact with a scooter charging port 255 when the scooter 210 is docked within the station 200. As described herein, the docking station 200 can include the charging connectors within both channels and/or within one of the channels.

In some cases, the rear wheel channel 230 (e.g., the lower channel) can include various components or materials to provide traction or friction to the rear wheel of a scooter as it moves through the channel 230. For example, the channel 230 (or in some cases, the front wheel channel 220) can include grit paper or coating, grooves or holes, expanded metal, a specific mating shape that matches the scooter tires, and/or a rotating disc, cog or gear shape positioned on the side of the wheel or cast into the tire to aid in providing traction for the wheel motor to be able to drive the scooter through the docking station.

Figure 2C:
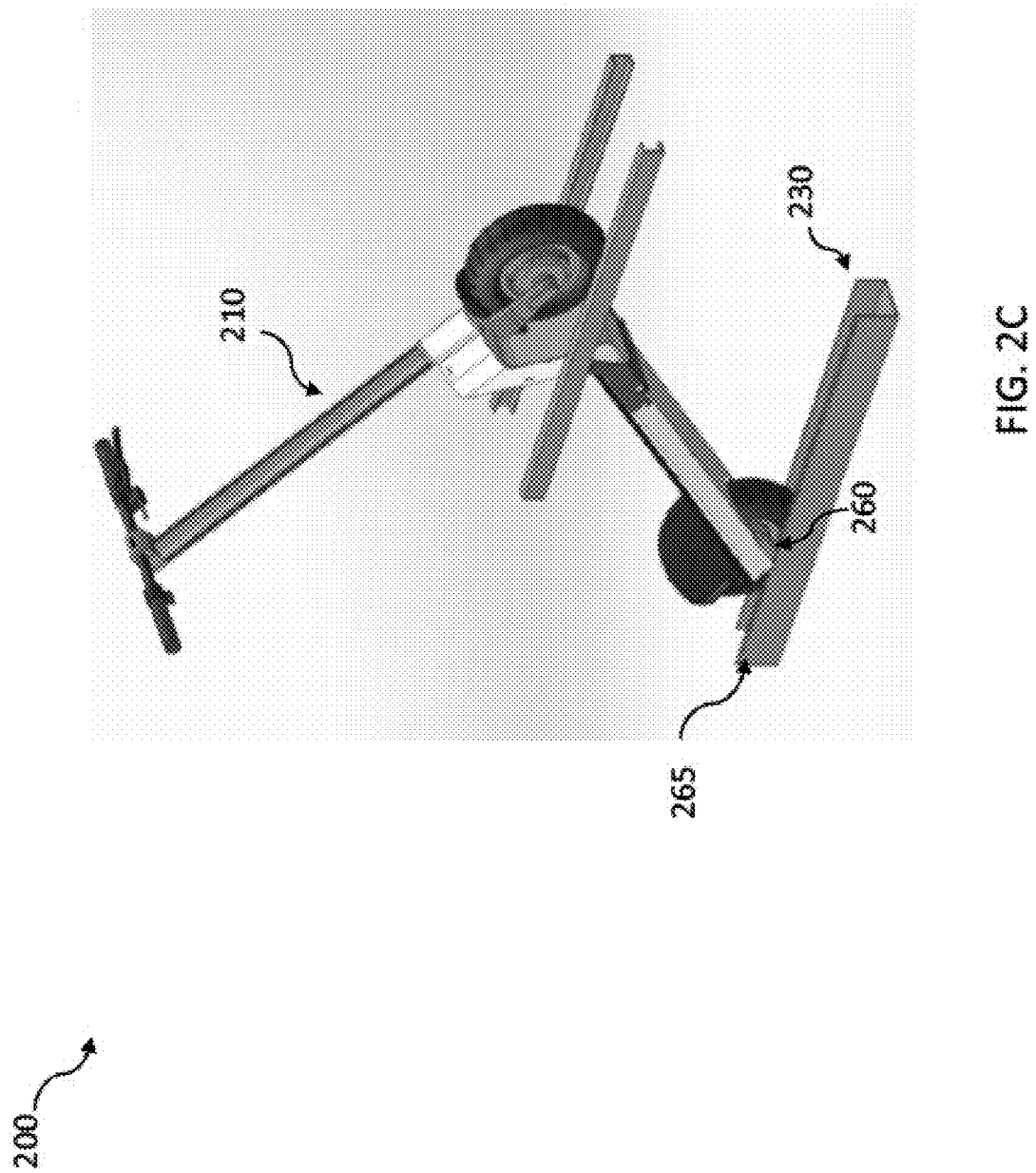
Figure 2D:
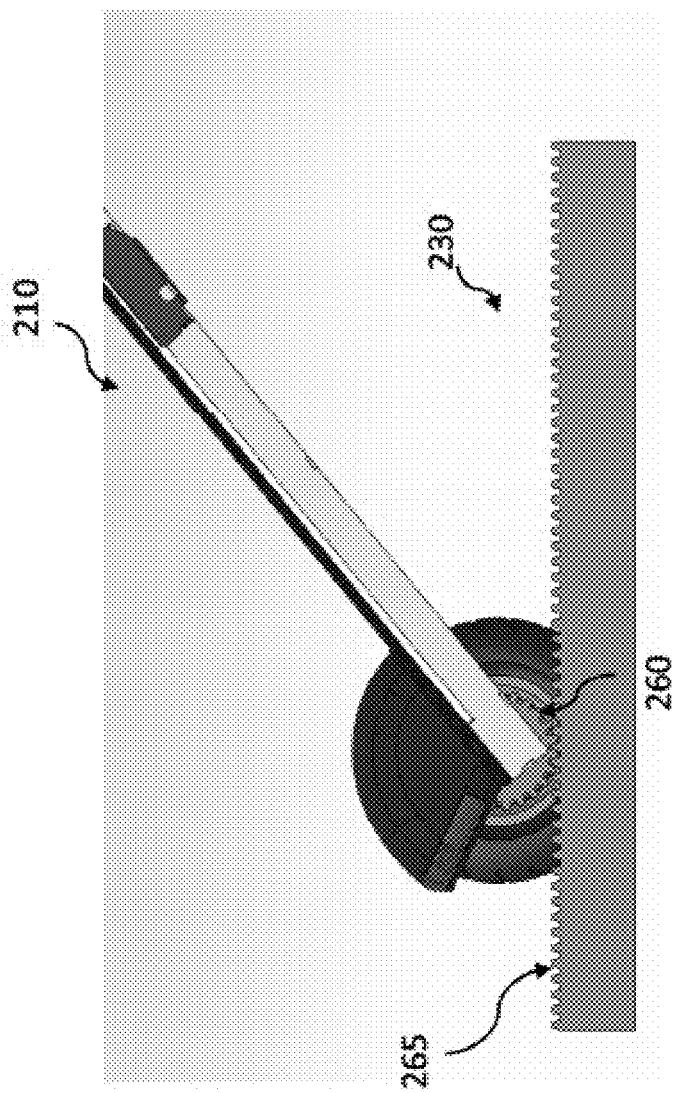

FIGS. 2C-2D depict a scooter traveling through a docking station with the assistance of a gear 260 and associated channel shape 265 to receive the gear 260. As shown, the scooter 210 includes the gear 260, which, when engaged with the sawtooth shape 265 of the channel, drives through the lower, or rear wheel, channel 230 as it moves through the docking station.

Figure 3:
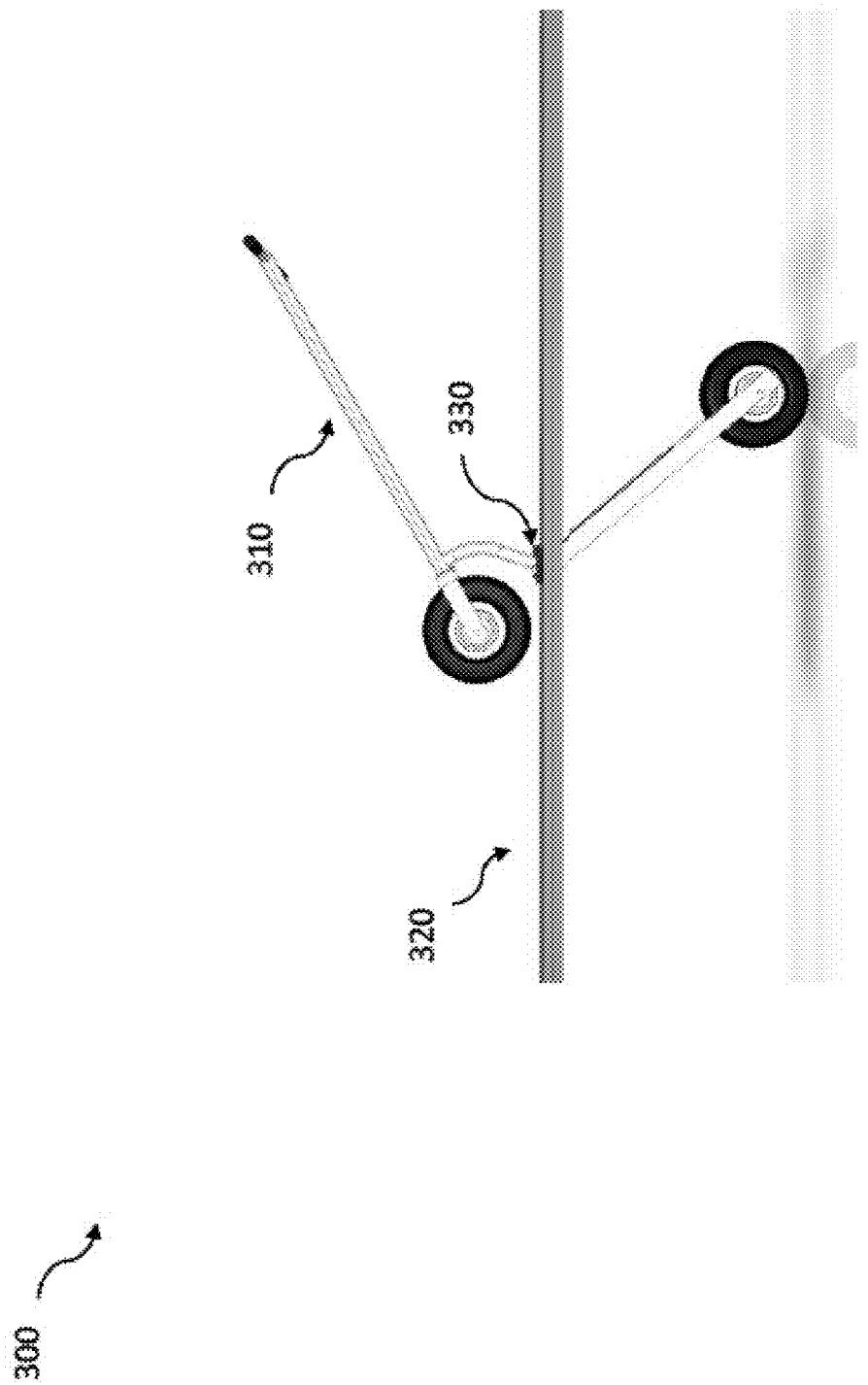
FIG. 3 is a diagram illustrating an electric scooter in contact with the electric scooter docking station.

FIG. 3 is a diagram illustrating an electric scooter in contact with an electric scooter docking station 300. The docking station supports an electric scooter 310 via one or more channels or rails 320. In order to facilitate removal of the scooter 310 from the station 300, the rails 320 include rail openings 330, which enable the scooter 310 to move up and out of the station 300 (e.g., out of the rail 320). As depicted, the electric scooter 310 includes guiding pegs, coupled to the rails 320, which allows the electric scooter 310 to move along the rails 320 and travel through the docking station 300.

Figure 4C:
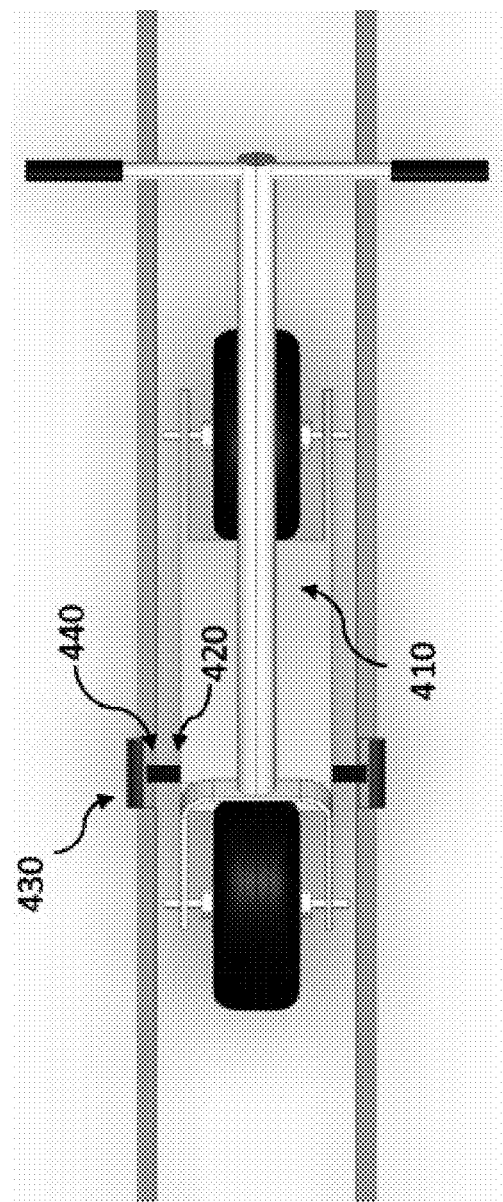

FIGS. 4A-4C present additional details, including the depiction of contact components between the electric scooter and the electric scooter docking station. An electric scooter 410 having fixed or rotating mechanical guiding pegs 420 (which can also be charging ports or electrical contacts, as described herein) is stored and/or racked within the channels or rails, such as rails 320. At certain points along the rails, openings 440 with associated covers 430 are positioned.

FIG. 5 is a diagram illustrating an electric scooter with electrical contact components 500. As shown, the electric scooter includes guiding pegs 420. Once the scooter 410 is in position, the covers 430 are rotated (or removed or slid), and the scooter 410 can be lifted out of the station 300 via the openings 440 (e.g., the guiding pegs travel up and out of the openings 1440).

Further, the guiding pegs 420 (or other components proximate to the pegs), being in contact with the rails (or electrical contacts with the rails), can facilitate the movement of the electric scooter, as well as the charging of the battery of the scooter, when docked within the docking station 300. FIGS. 6A-6D are diagrams illustrating components configured to couple an electric scooter to a docking station.

Figure 6A:
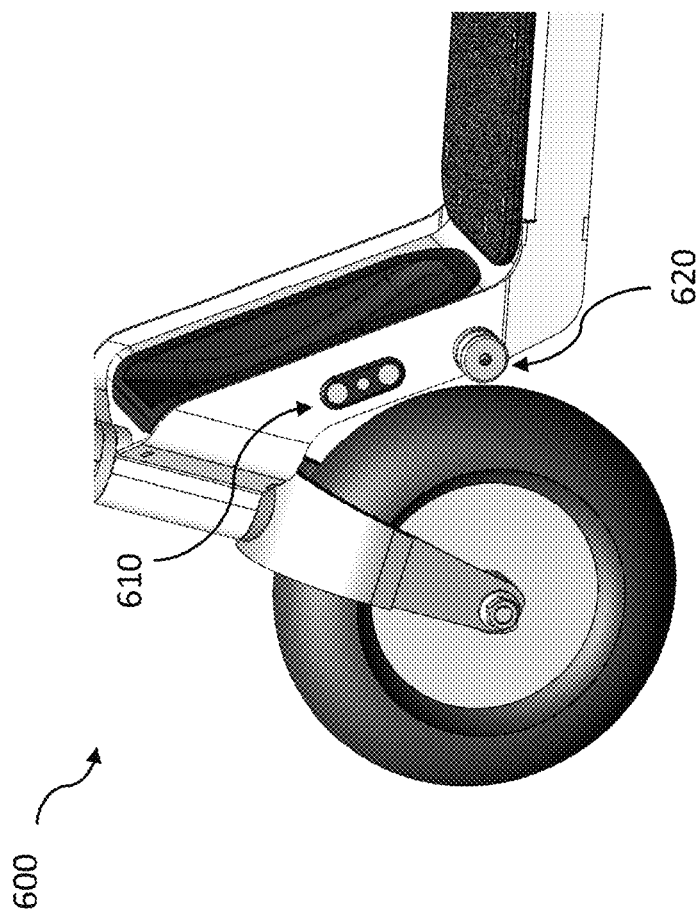

FIG. 6A depicts an electric scooter 600 having guiding pegs 620 and contact pads 610 that facilitate communication and/or electrical charge transfer. The guiding pegs 620, as described herein, act to position the scooter within a docking station (within the rails) and guide the scooter through the docking station (e.g., from entry to exit). The contact pad 610, which is positioned proximate to the guiding peg 620 (e.g., on or along the chassis or steering tube), enables the electric scooter 600 to electrically couple to a mating contact on a docking station and receive charge from the docking station. As described herein, the mating contacts can be rails, fixed contacts, sliding contacts, rolling contacts, and so on.

Figure 6C:
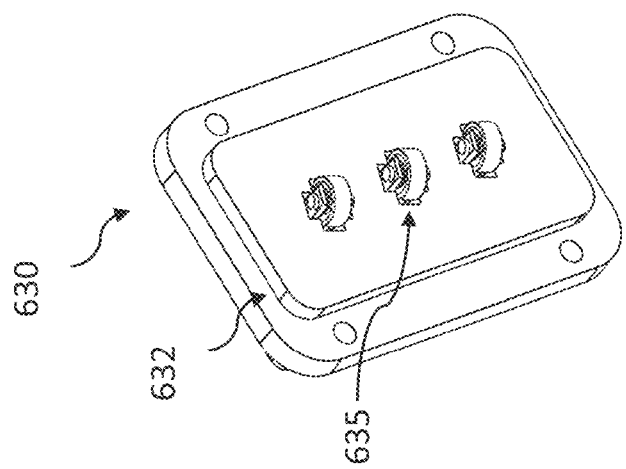
Figure 6B:
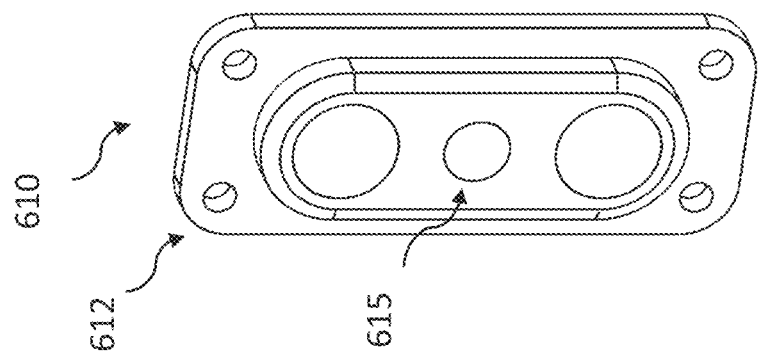

FIG. 6B depicts an example contact pad 610. The contact pad 610 includes a base 612 that facilitates attachment to the electric scooter (e.g., on a side surface of the chassis), and one or more contact points 615 formed of a conductive material (e.g., copper, nickel, or other metals or alloys) mounted to or bonded to the base 612. The contact points 615 facilitate the transfer of current to the electric scooter, such as from electric components of the docking station (e.g., positioned on the rail).

FIG. 6C depicts an example mating contact plunger 630 provided by or positioned on the rail of a docking station. The contact plunger 630 includes a base 632 configured to attach the contact plunger 630 to a rail of the docking station.

Further, the contact plunger 630 includes rolling contacts 635, which are adapted to make contact with the contact points 615 of the electric scooter 600 when the scooter 600 is positioned within the rail of the docking station. Thus, the rolling contacts 635, made from various conductive materials (e.g., metals or alloys), facilitate the transfer of current or charge from the docking station to the electric scooter 600 when in contact with the contact points 615 of the contact pad 610.

As described herein, the docking station may include rails having certain shapes that facilitate the positioning of the electric scooter 600 within the docking station such that the station restricts the scooter 600 from moving laterally when docked and in electrical contact with the rail or other contacts. FIG. 6D depicts the electric scooter 600 positioned within the rail and in contact with the docking station.

As shown, the contact pad 610 of the scooter 600 is coupled to the contact plunger 630 of the docking station. Further, the guiding pegs 620 of the scooter 600 are positioned within two rails 640, 645. The rail 640 includes a V-shaped groove, which matches a shape or contour of the mounting peg 620. Thus, when the peg 620 is positioned within the rail 640 such that the V-shape aligns with a matching portion of the peg 620, the peg 620 is prevented from moving laterally within the rail, and the scooter 600 is likewise prevented from moving laterally within the docking station (and possibly losing contact with the contact plunger 630 of the rail).

Figure 7:
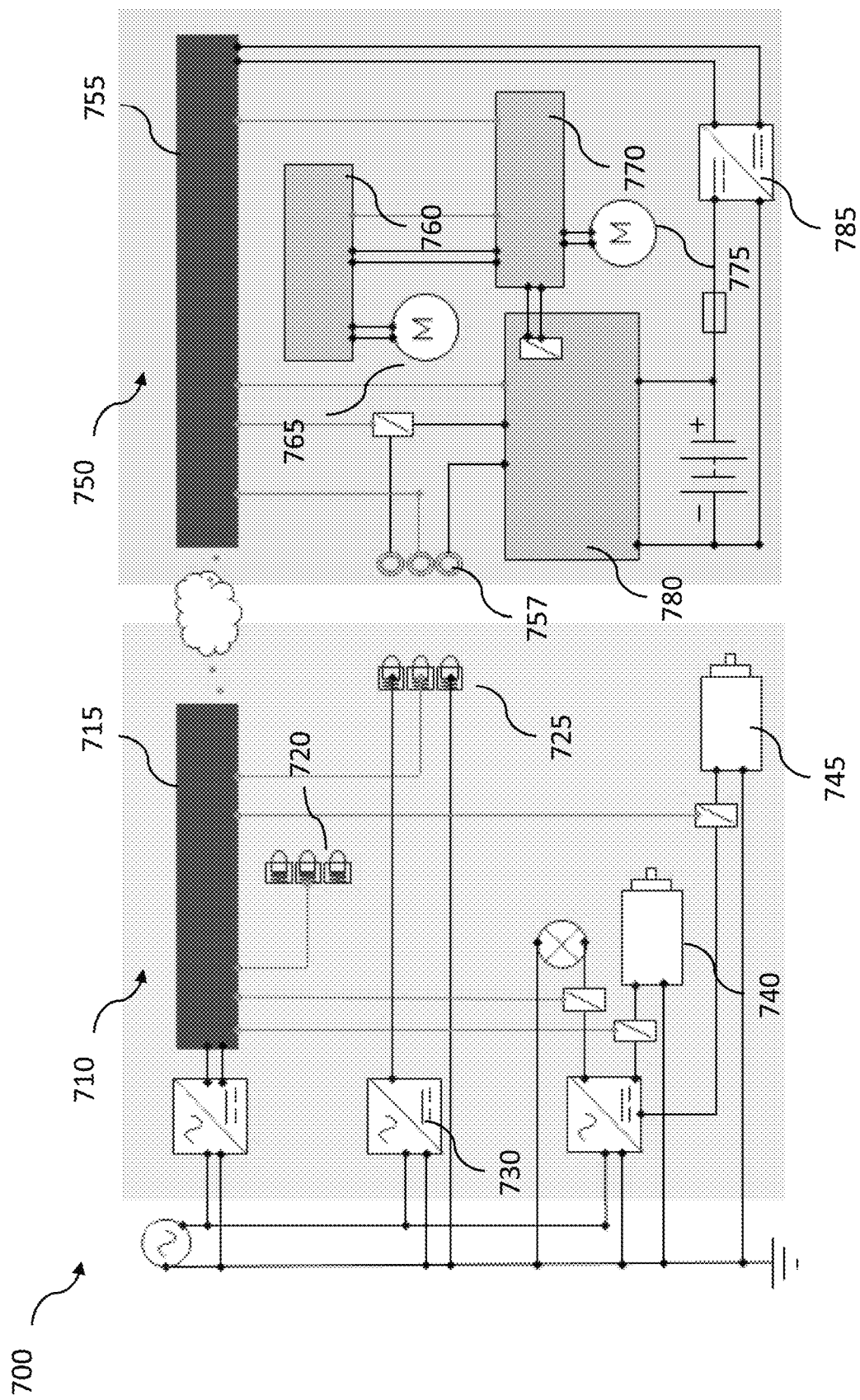
FIG. 7 is a block diagram illustrating components of the electric scooter and the electric scooter docking station.

As described herein, the docking station can transfer charge to the electric scooter 600 when the scooter 600 is electrically coupled to the docking station. FIG. 7 depicts system level components 700 of the electric scooter 600 and the electric scooter docking station that facilitate the transfer of current between the docking station and the scooter 600.

The docking station 710 includes a management system (VMS) 715 or other similar control unit, which controls and manages the functions of the docking station 710. For example, the VMS 710 controls operations in response to signal received from an entry sensor 720, which detects the entry of scooters into the docking station. Further, the VMS 715 can interact with contact plungers 725 to provide or transfer charge to the scooters, as well as batteries and charging devices 730, an entry solenoid 740 that controls operations of the entry section of the station, an exit solenoid 745 that controls operations of the exit section of the station, and other electrical units or devices.

The electric scooter 750 likewise includes a vehicle management system 755, similar to VMS 715, which acts as the controller for the electric scooter 750. The VMS 755 can control or manage propulsion of the scooter, a battery or battery management system, on-board chargers, and other electrical units or devices.

For example, the scooter 750 includes contact pads 757, as described herein, which receive charge and communication (e.g., data, signals, or information) from the docking station. The scooter also includes multiple motor controllers 760, 770, which control multiple motors 765, 775 (e.g., for each wheel) in response to instructions provided by the VMS 755. A battery management system (BMS) 780 controls an associated rechargeable battery 785, which powers the motor controllers 760, 770, and motors 765, 775. The BMS 780 operates to monitor the charge state of the battery, as well as control the use of the battery to maintain the life of the battery and efficiently charge and discharge the battery 785.

In addition, as described herein, communication such as data or information exchange may occur between the docking station 710 and the electric scooter 750 via a wireless local connection, a cellular connection, Wi-Fi, Bluetooth, or via contacts that are part of the electrical recharging systems of the docking station 710.

Thus, as described herein, the electric scooter 750, when electrically coupled to the docking station 710, can receive the transfer of current from the docking station and charge its batteries when docked within the station.

Other embodiments of the docking stations described herein facilitate various actions performed by the docking stations and/or docked scooters. For example, when a pair of charging posts on an electric scooter slide along a pair of electrified rails, the scooter can determine how far it travels along the rails. The station can provide a series of contact segments, which have a known, predefined length. For example, for the sections of rail between contact segments, there is no electrical connection between the rails and the scooter charging posts. As the scooter travels along the rails, the charging posts make contact with the different contact segments and count the number of times that the posts lose electrical contact with the rail and come back into contact. Because the segments have a known, predefined length, the scooter can calculate how far it has travelled down the rail and determine its position within the station.

Further, while charging posts and pegs are described herein, in some cases, the handlebars of the electric scooters may include and/or act like the charging pegs, and directly contact conductive rails within a docking station. Thus, a rail charging interface within a channel or other component of a docking station can be configured into various shapes, positions, or designs, in order to make contact with a charging peg or post of a scooter, regardless of whether the charging post or peg is a separate component, part of the handle bars of the scooter, part of a down tube of a scooter, part of a fork of a scooter, part of a chassis of a scooter, and so on.

In addition, the docking station, in some cases, can include jigs or hooks that are attached to the rails or channels and slide along the rails or channels and contact the scooter, providing mechanical positioning, charging, and/or communication functions (either wirelessly or via direct contact with the electric scooter, as described herein).

As another example, in some embodiments, the electric scooter includes a pair of charging/guiding posts or pegs, which can include a conductive electrical surface for charging, and a mechanical/structural surface for guiding. A docking station can provide rails that include a low-friction rub strip and an electrical bus bar. Thus, each rail contacts a charging/guiding post on a scooter, providing physical guidance and alignment through the dock, and electrical current for battery charging, as described herein.

In some embodiments, terminal ends of a rail or channel can be electrically isolated from the charging portion of the rail. These rail sections can then be energized by a scooter using its onboard power. When energized, these rail sections provide power to ancillary functions of the dock, such as dock identification, communication, data storage (e.g., storing information about how many scooters have entered and exited the dock), and actuation (e.g., moving the location of a locking pin so that a scooter may be removed from the dock). The computing systems described herein can facilitate performing some or all of these functions.

In some cases, a constant or time-varying controlled current circuit is powered by a scooter's battery (and where the precise current is measured by the scooter's electronics over time). The numerical value of the current encodes information used by the scooter's electronics to determine factors such as the presence of a dock, identification of a dock, diagnostic information, and other information.

Further, in some cases, many or multiple electric battery-powered scooters are parked or stored in a docking station. As described herein, the docking station can include bus bars that are in electrical contact with each scooter's battery charging electronics. The charging electronics include voltage converters to decrease battery voltage to a safe voltage on the dock bus bars. The scooters in a dock communicate via power line or wireless components to negotiate charge balancing from scooters with excess battery charge to scooters with low battery charge. Thus, scooters with excess charge can supply current to the dock bus bars, and scooters with low battery charge use that current to charge their batteries.

As described herein, the docking station, such as docking station 100 or 200, includes a Z-shaped exit section or ramp, which enables the dispending of scooters from the docking station without damaging the scooters, even when the scooters are stored in various angular or vertical arrangements within the docking station.

Figure 8:
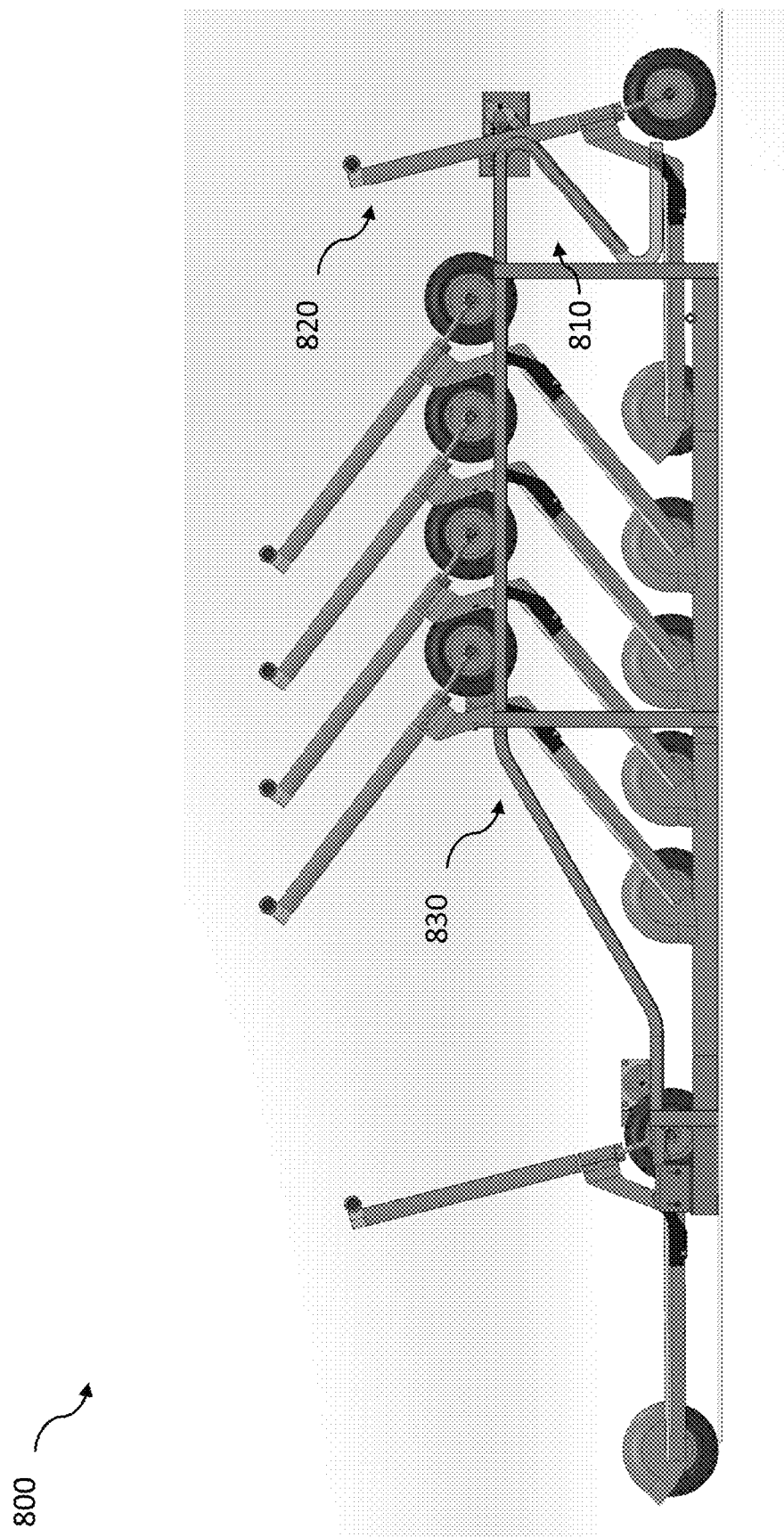
FIG. 8 is a diagram illustrating an electric scooter docking station with a Z-shaped exit section.

FIG. 8 is a diagram illustrating an electric scooter docking station 800 with a Z-shaped exit section. As depicted, the docking station 800 includes a Z-shaped exit ramp 810, which facilitates a smooth exiting of scooters from station 800 in compact- and space-saving configurations. An electric scooter 820 moves from the main housing area 830 to the exit section 810 of the station, travels down the Z-shaped section, and is disposed parallel to the ground and ready to be dispensed to a user.

Figure 9A:
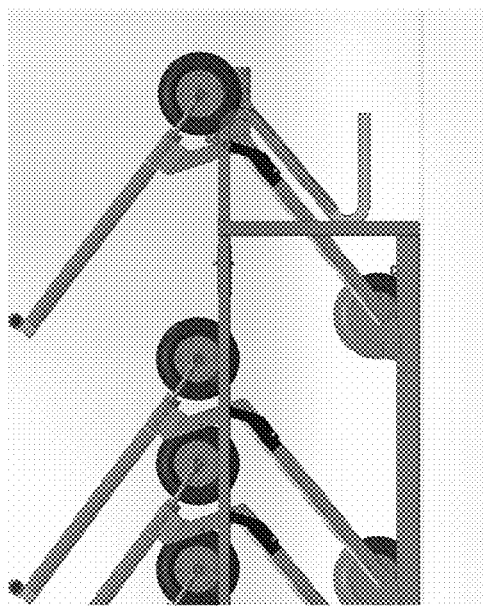
FIGS. 9A-9D are diagrams illustrating the dispensing of an electric scooter from the electric scooter docking station.
Figure 9B:
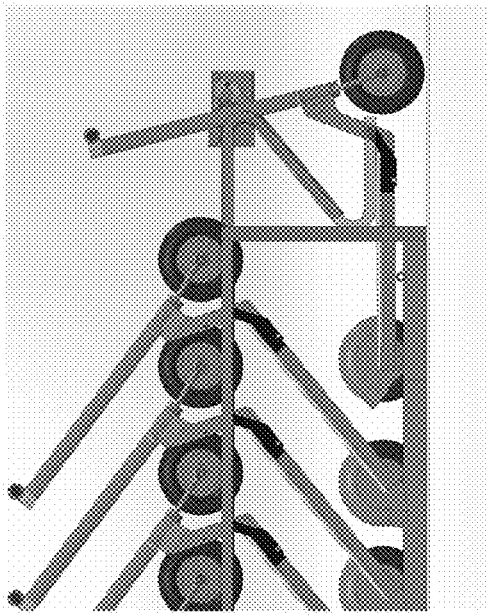
Figure 9D:
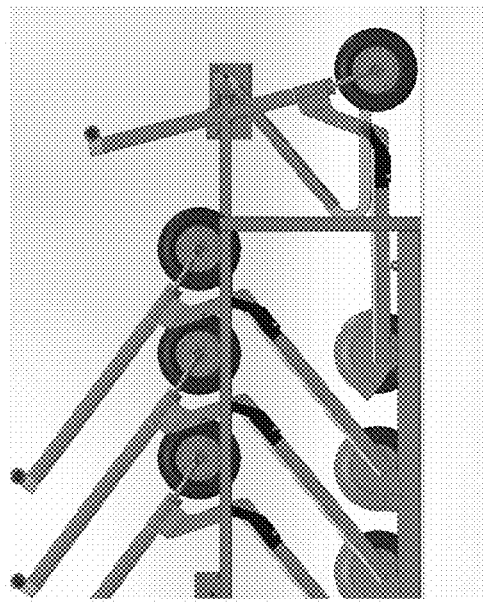
Figure 9C:
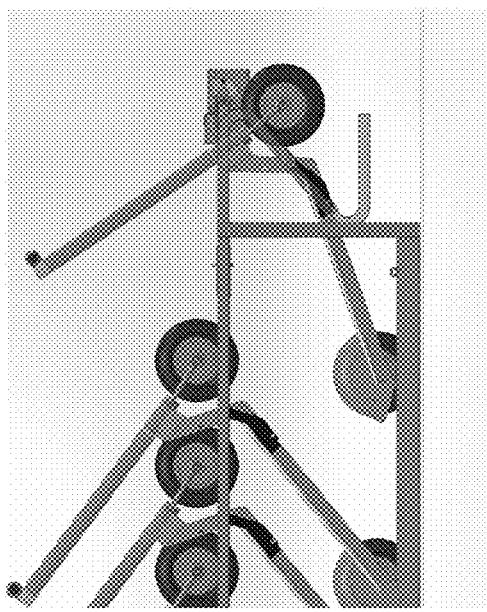

FIGS. 9A-9D illustrate operation of the Z-shaped exit ramp 810. As shown in FIG. 9A, a first scooter is positioned to exit the ramp 810. Other scooters docked in the station are in line and charging before exiting the station. Next, as depicted in FIG. 9B, after the first scooter is taken from the station, the next scooter moves to the front of the ramp 810 (at the top of the "Z"). In FIG. 9C, the scooter travels down the Z shape of the ramp 810 (depicted as a backwards Z), with the rear motor of the scooter regulating the movement so the scooter smoothly travels down the Z shape of the ramp 810. Finally, in FIG. 9D, a scooter exits (is taken by a rider), and the other scooters move forward, while continuing their charging operations, as described herein.

Of course, the docking stations described herein can include other exit (or entry) sections or components.

Examples of Alternative Electric Scooter Docking Station Configurations

As described herein, the docking stations can be configured to store electric scooters in a variety of ways, such as vertically, horizontally, front to back, side by side, and so on. For example, the electric scooters 210 can operate such that the wheels provide opposing forces to one another, increasing a level of friction and grip between the wheels and the channels. In such cases, the docking station, via the rails, can facilitate the movement of the scooter 210 up or down vertically within a station. In such cases, the scooter 210 controls the torque applied to the wheels (via internal wheel motors) to adjust the grip to the inside of a rail, channel, or other component. The scooter 210, therefore, can effectively climb and move within the station, via an x-axis, y-axis, z-axis, or various angles, as it moves along within the station.

FIGS. 10A-10H are diagrams illustrating an electric scooter docking station having a vertical storage configuration. For example, the scooter 210 can move through and up the rails of the docking stations, such that they are docked on top of one another in a vertical column of scooters.

Figure 10A:
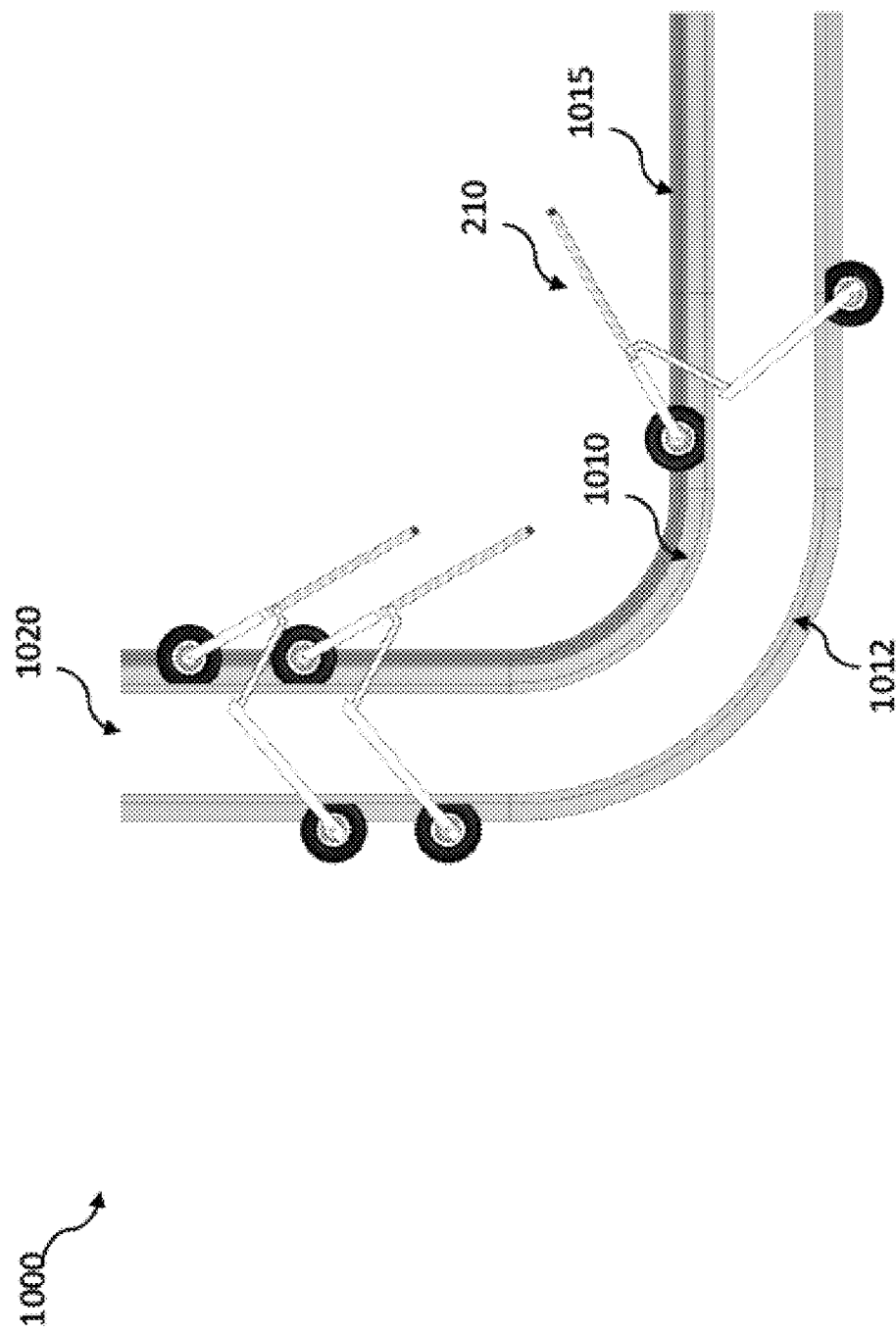
FIGS. 10A-10H are diagrams illustrating an electric scooter docking station having a vertical storage configuration.
Figure 10B:
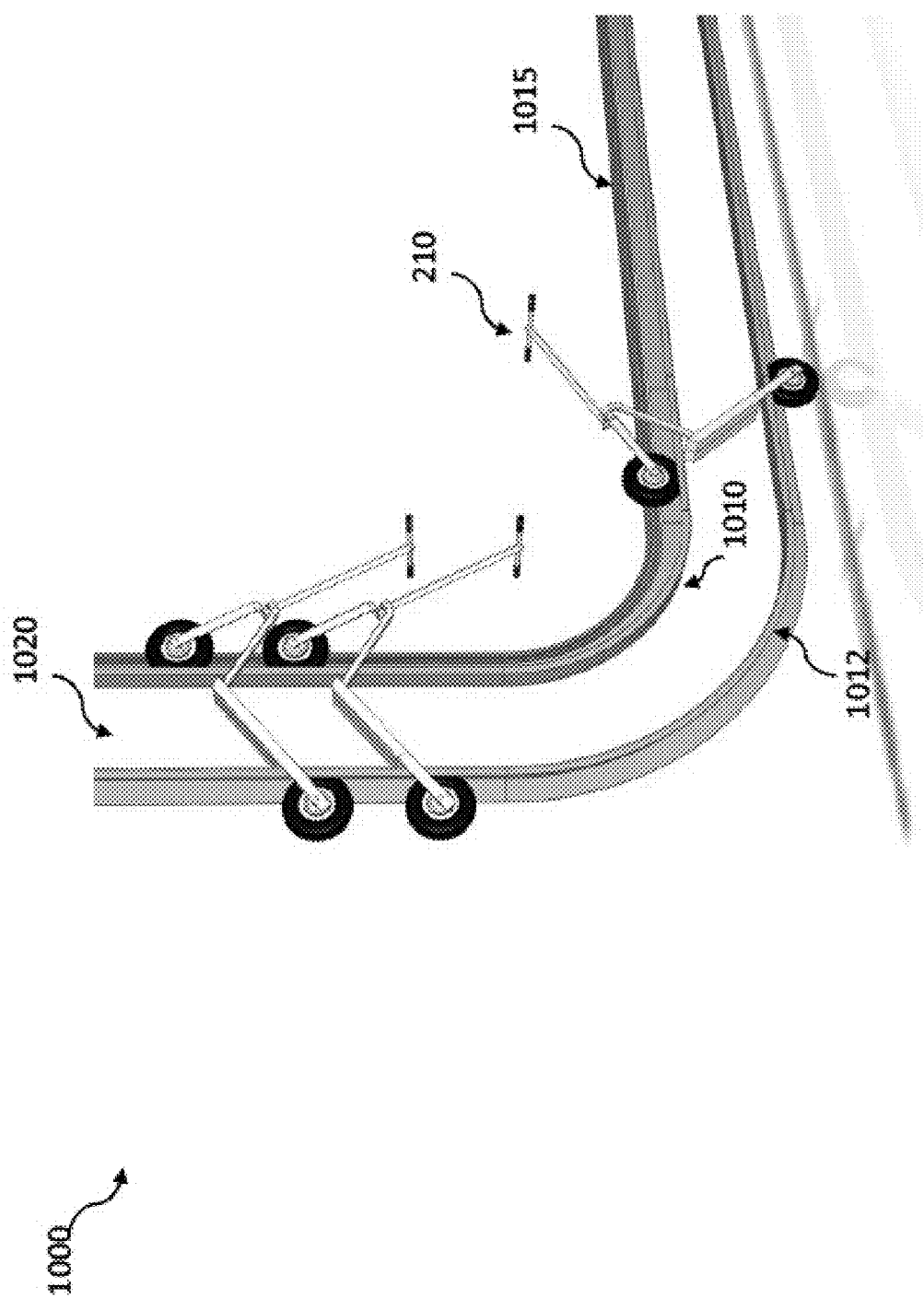

FIGS. 10A and 10B depict a rail section 1000 having an inner wheel track 1010 for an upper channel, as well as an inner wheel track 1012 for a lower channel. The inner wheel track 1010 of the upper channel also includes a front wheel charging port 1015 or connector, which charges the scooter 210 within the docking station. As described herein, the wheels of the scooter 210 contact and grip the inner wheel tracks 1010, 1012 and self-propel along and up the station towards a docking or storage area 1020. Thus, as depicted, the rail section 1000 (e.g., part of docking stations described herein) facilitates the vertical stacking and/or storage of electric scooters within a docking station.

Figure 10C:
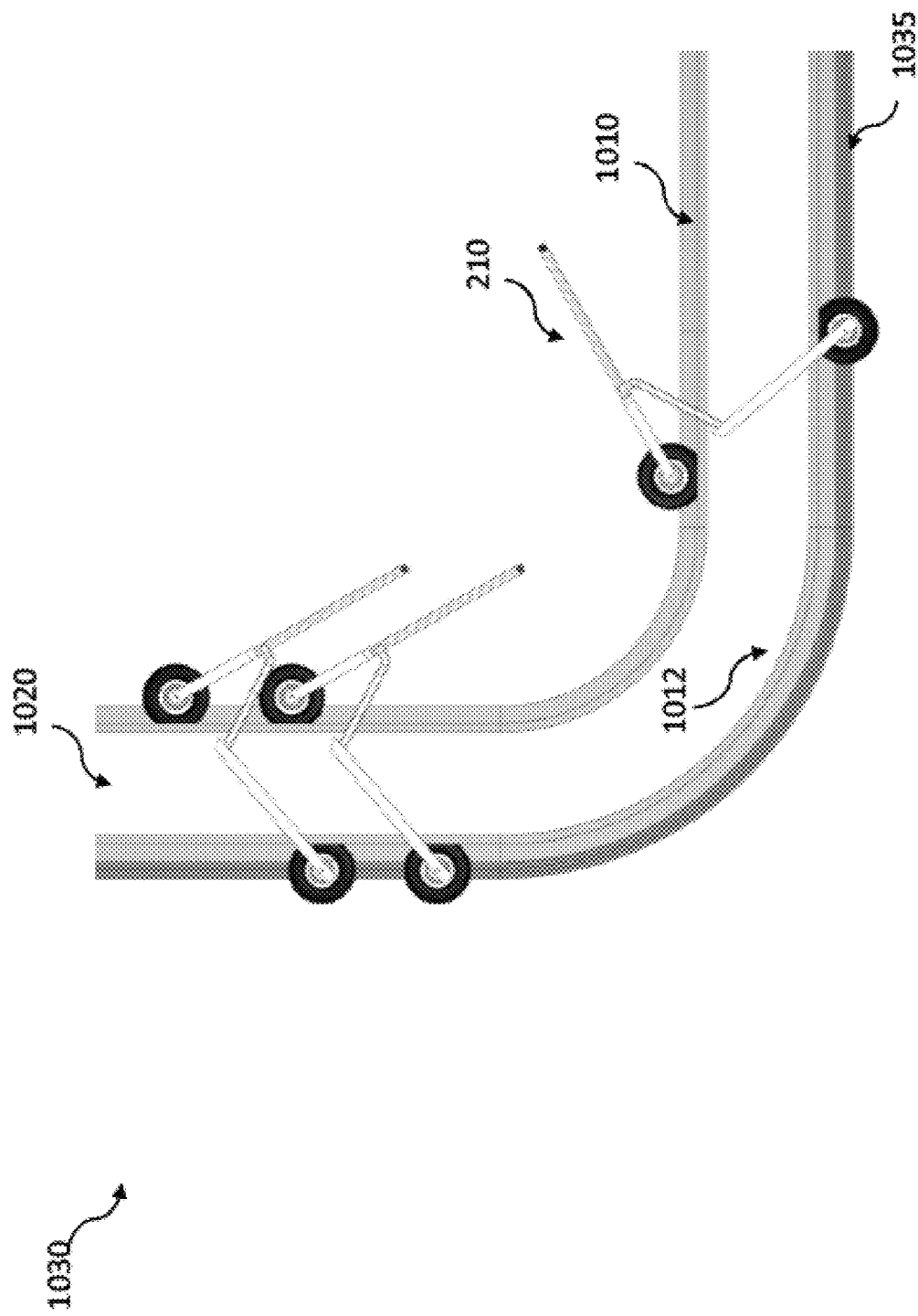
Figure 10D:
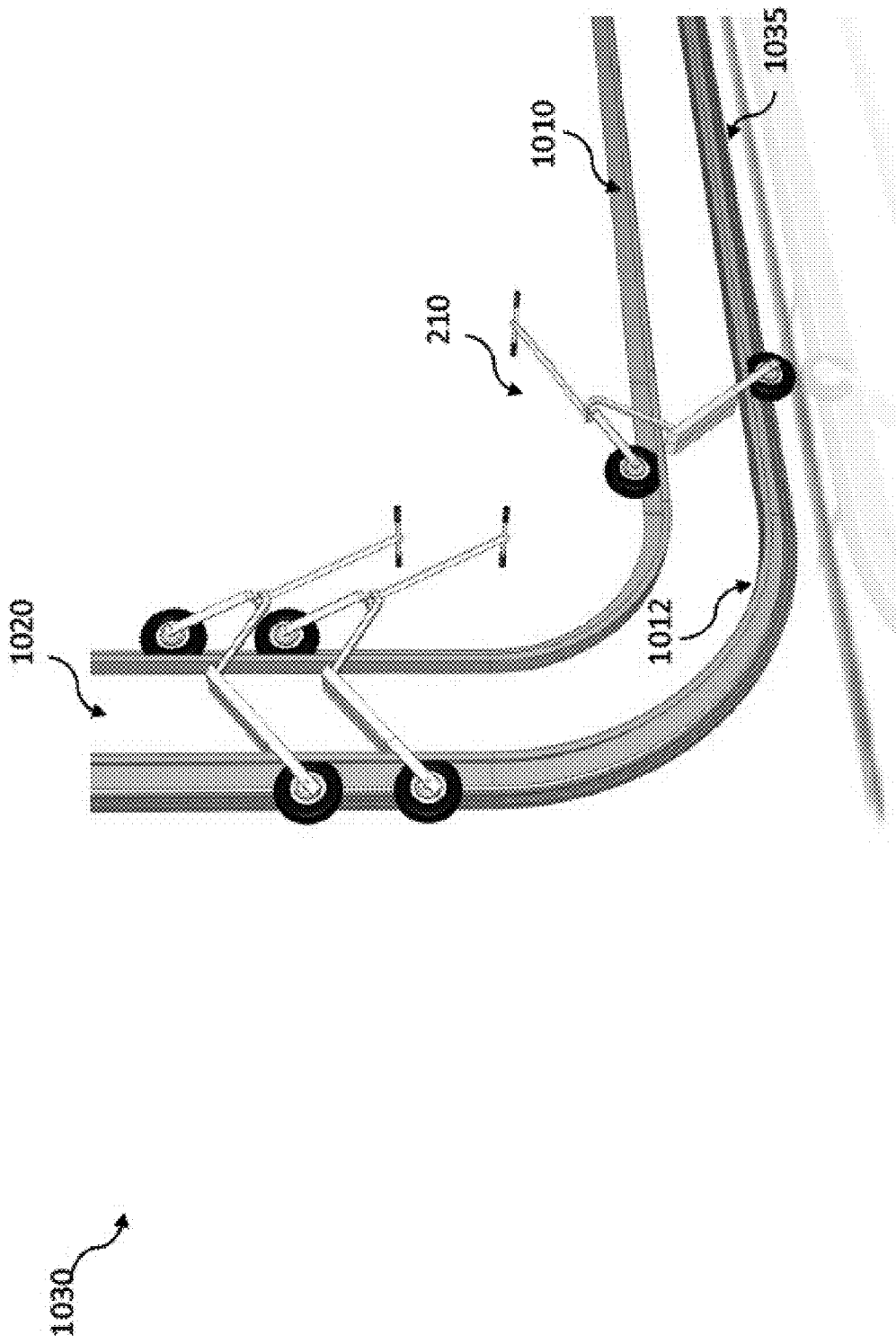

FIGS. 10C and 10D depict a rail section 1030 that is similar to the rail section 1000, except the lower channel includes a real wheel charging port 1035 or connector, which charges the scooter 210 within the docking station.

Figure 10E:
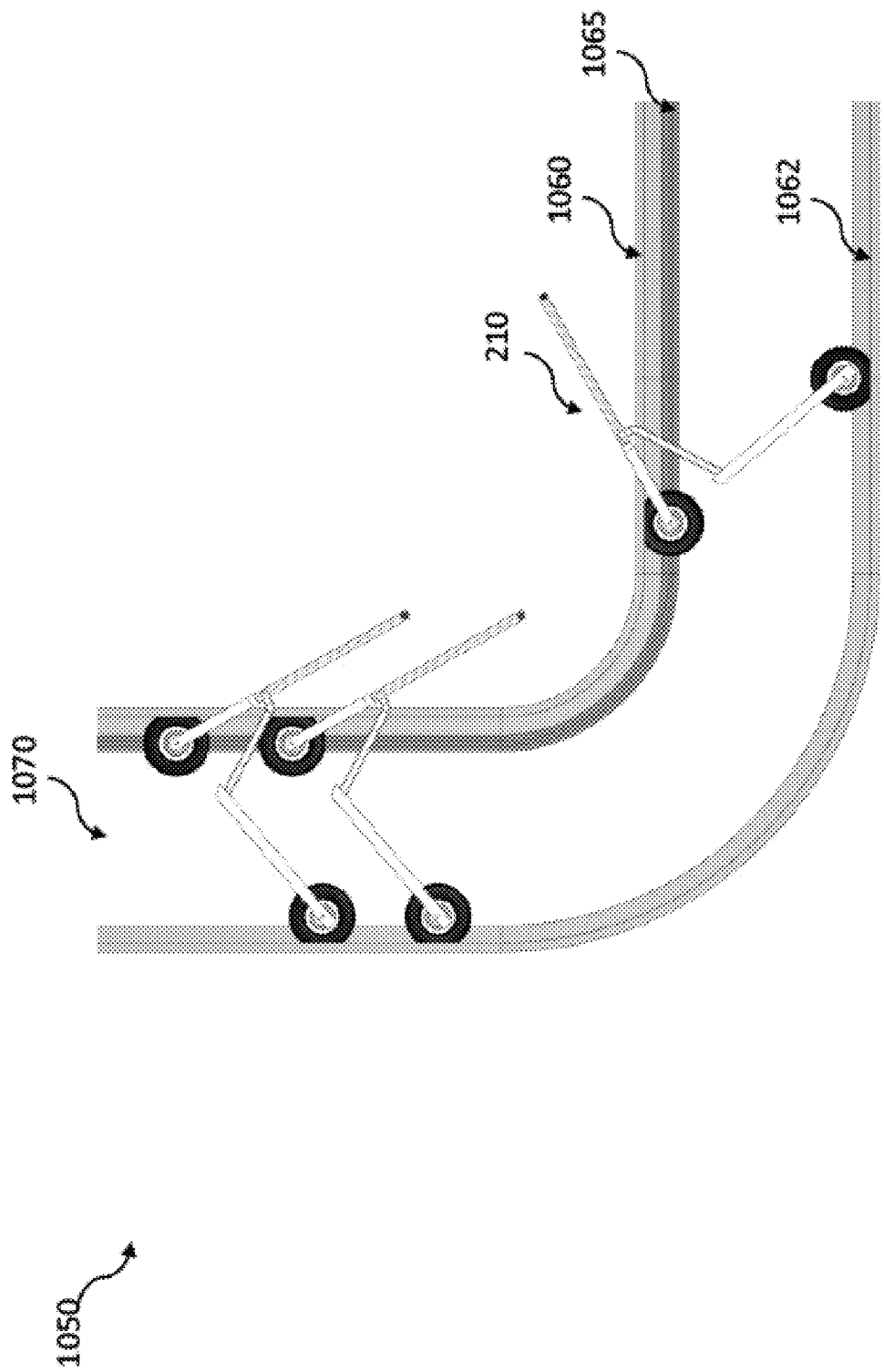
Figure 10F:
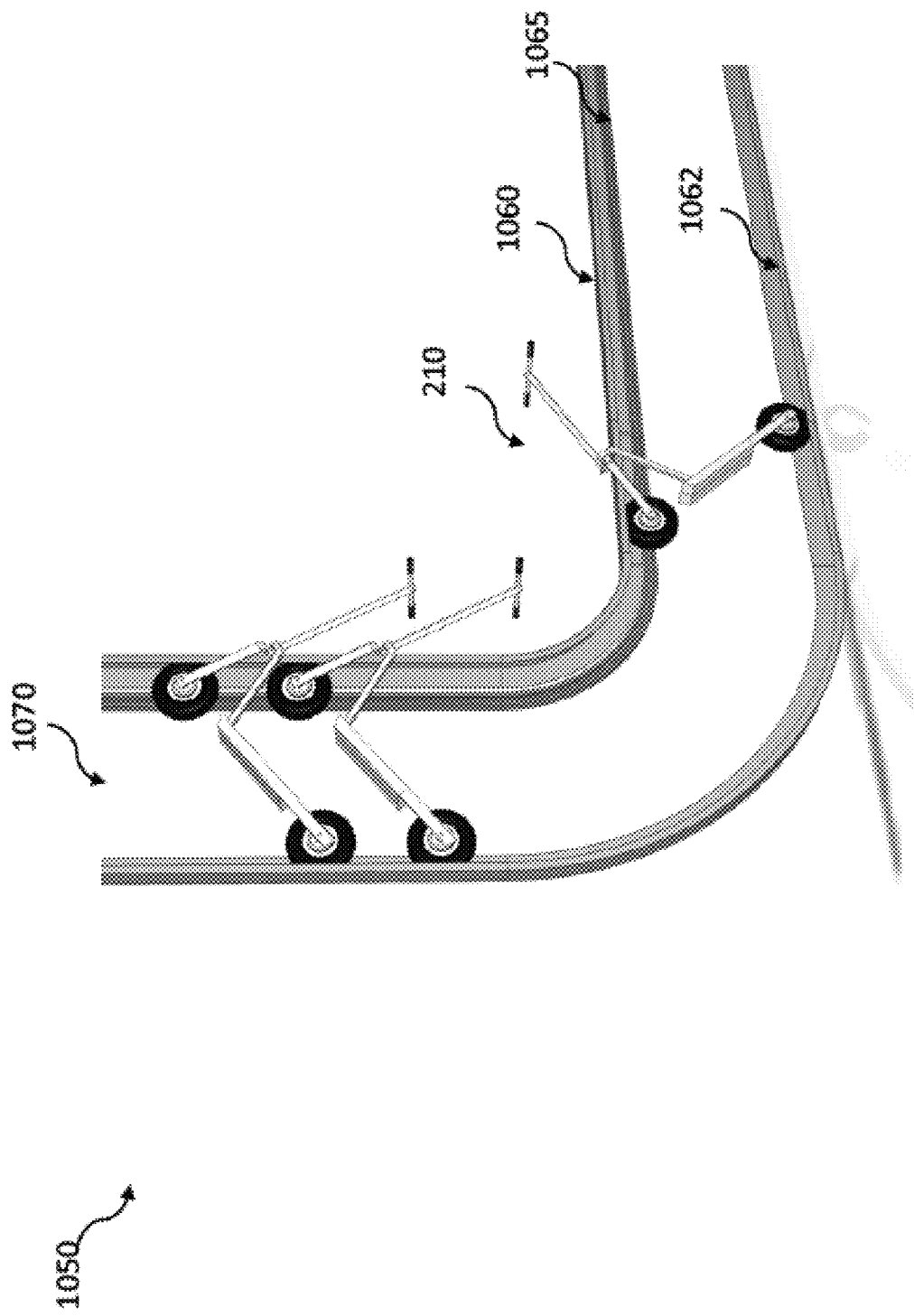

FIGS. 10E and 10F depict a rail section 1050 having an outer wheel track 1060 for an upper channel, as well as an outer wheel track 1062 for a lower channel. The outer wheel track 1060 of the upper channel also includes a front wheel charging port 1065 or connector, which charges the scooter 210 within the docking station. As described herein, the wheels of the scooter 210 contact and grip (e.g., pushing out on) the outer wheel tracks 1060, 1062 and self-propel along and up the station towards a docking or storage area 1070. Thus, as depicted, the rail section 1050 (part of docking stations described herein) facilitates the vertical stacking and/or storage of electric scooters within a docking station.

Figure 10G:
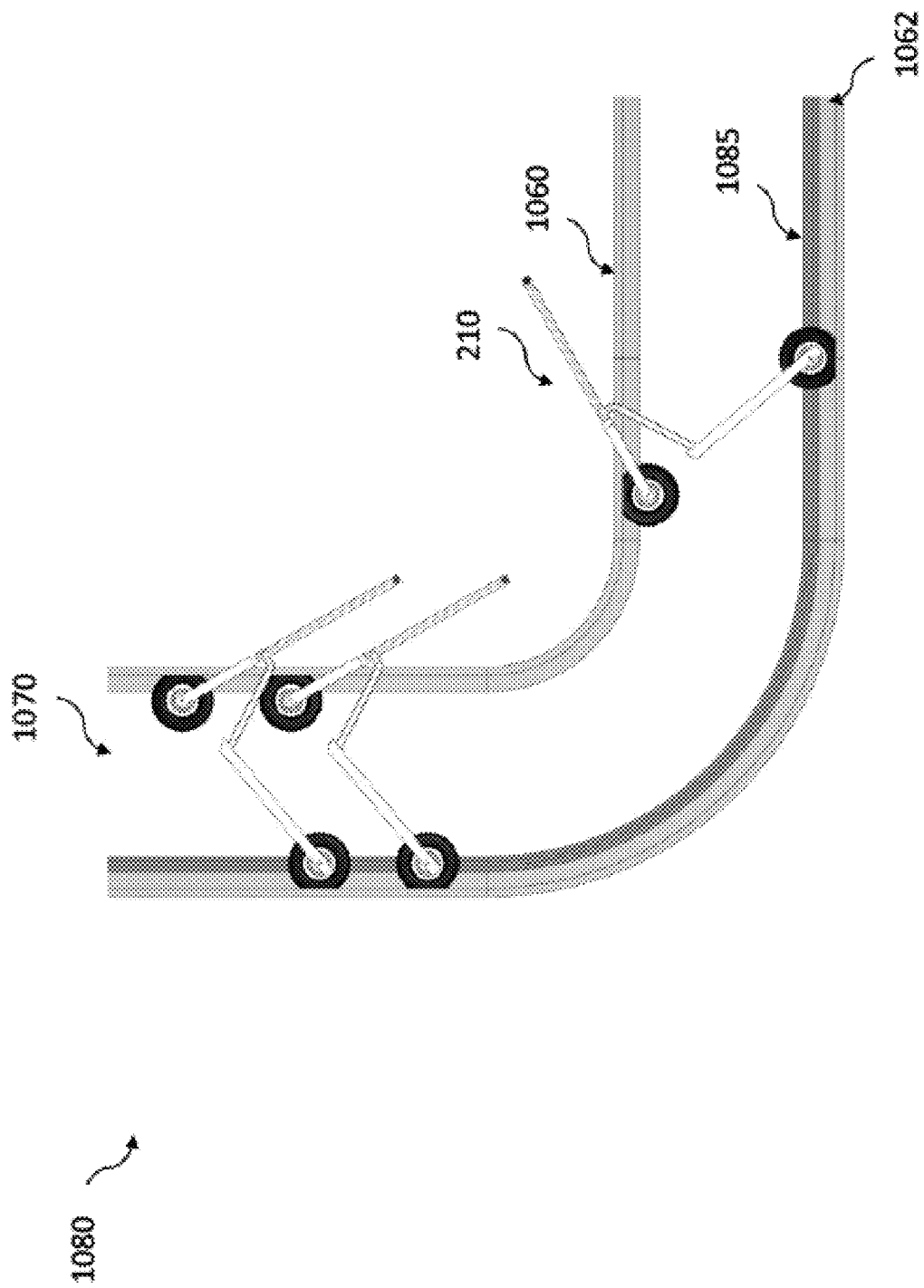
Figure 10H:
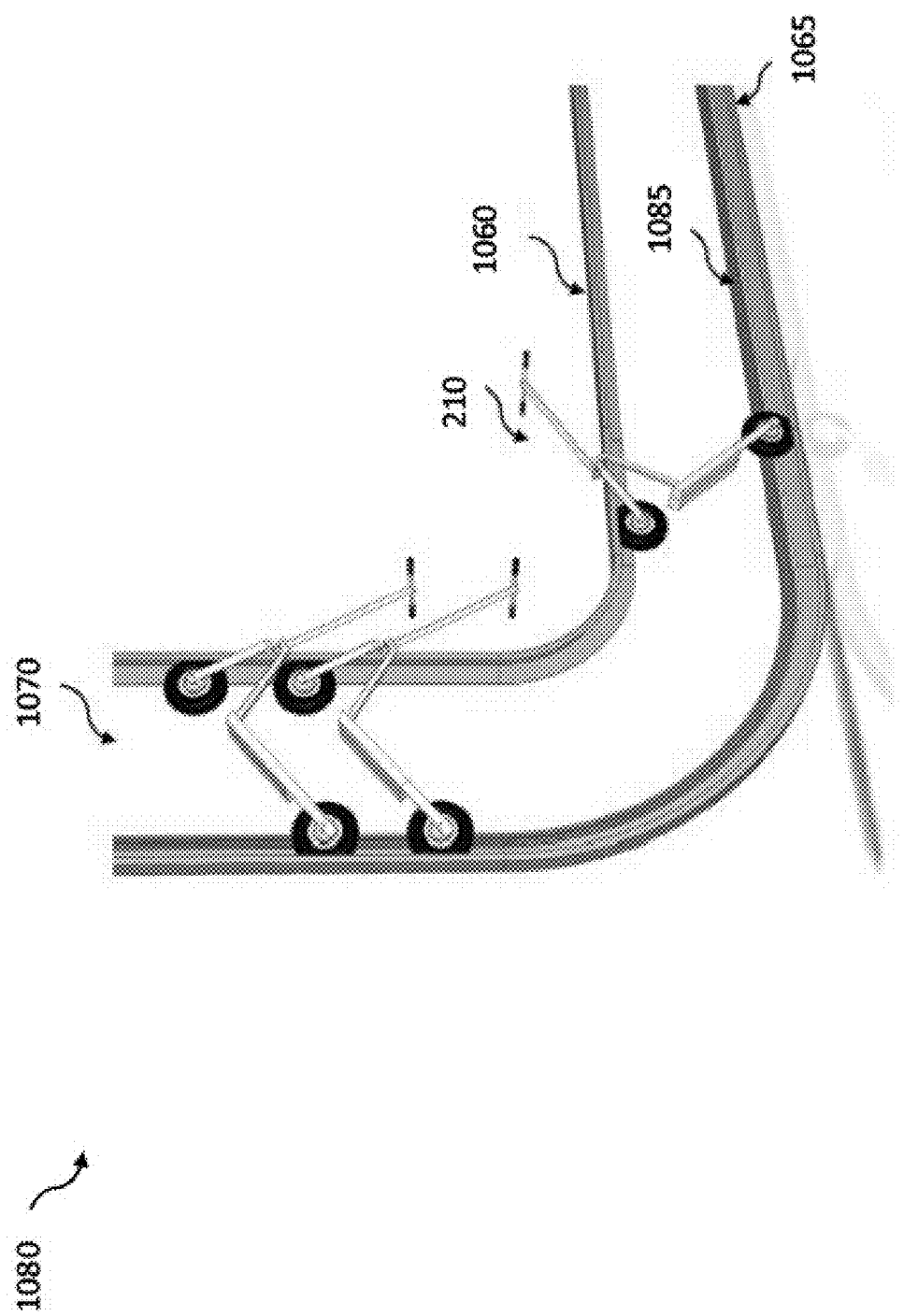

FIGS. 10G and 10H depict a rail section 1080 that is similar to the rail section 1050, except the lower channel includes a real wheel charging port 1085 or connector, which charges the scooter 1010 within the docking station.

Figure 11A:
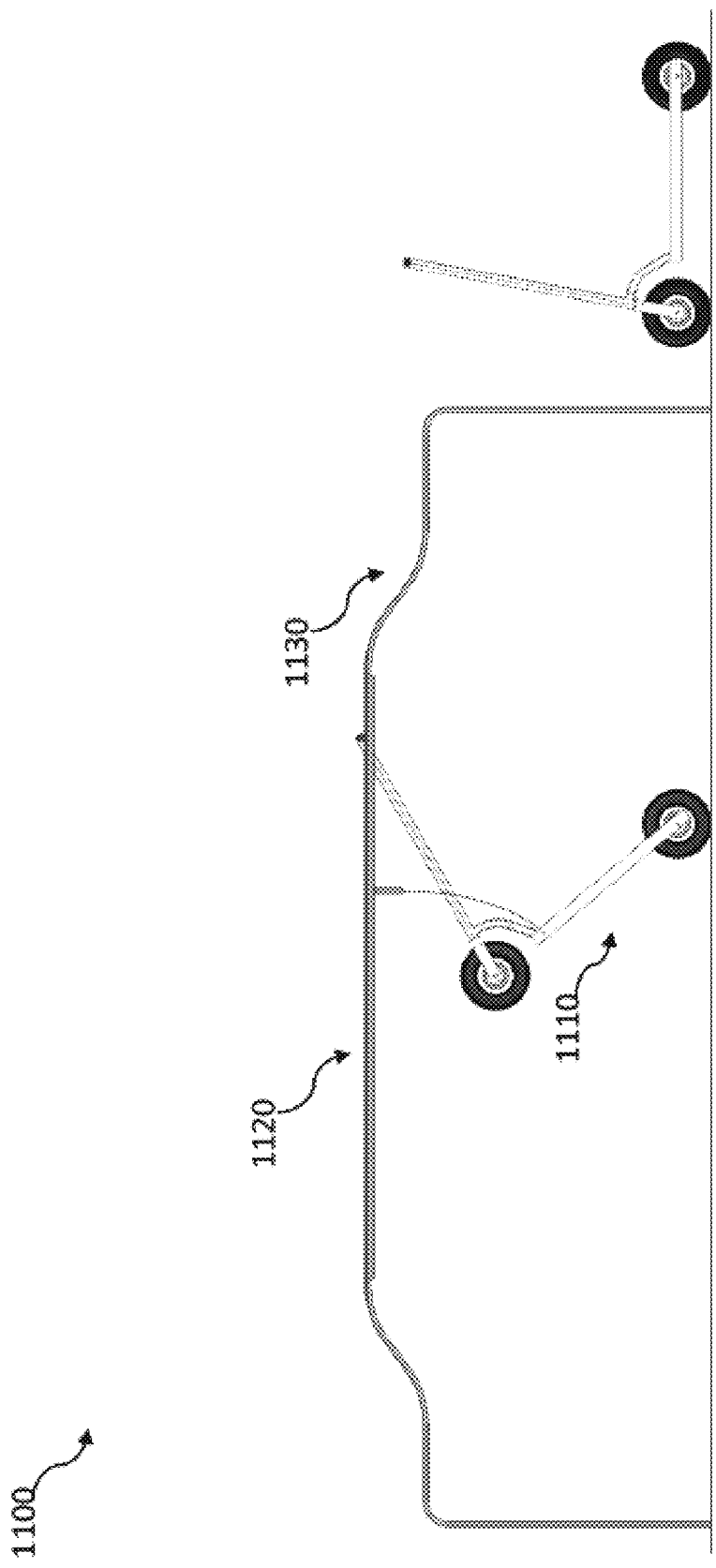
FIGS. 11A-11C are diagrams illustrating an electric scooter docking station having a handlebar coupling configuration.
Figure 11B:
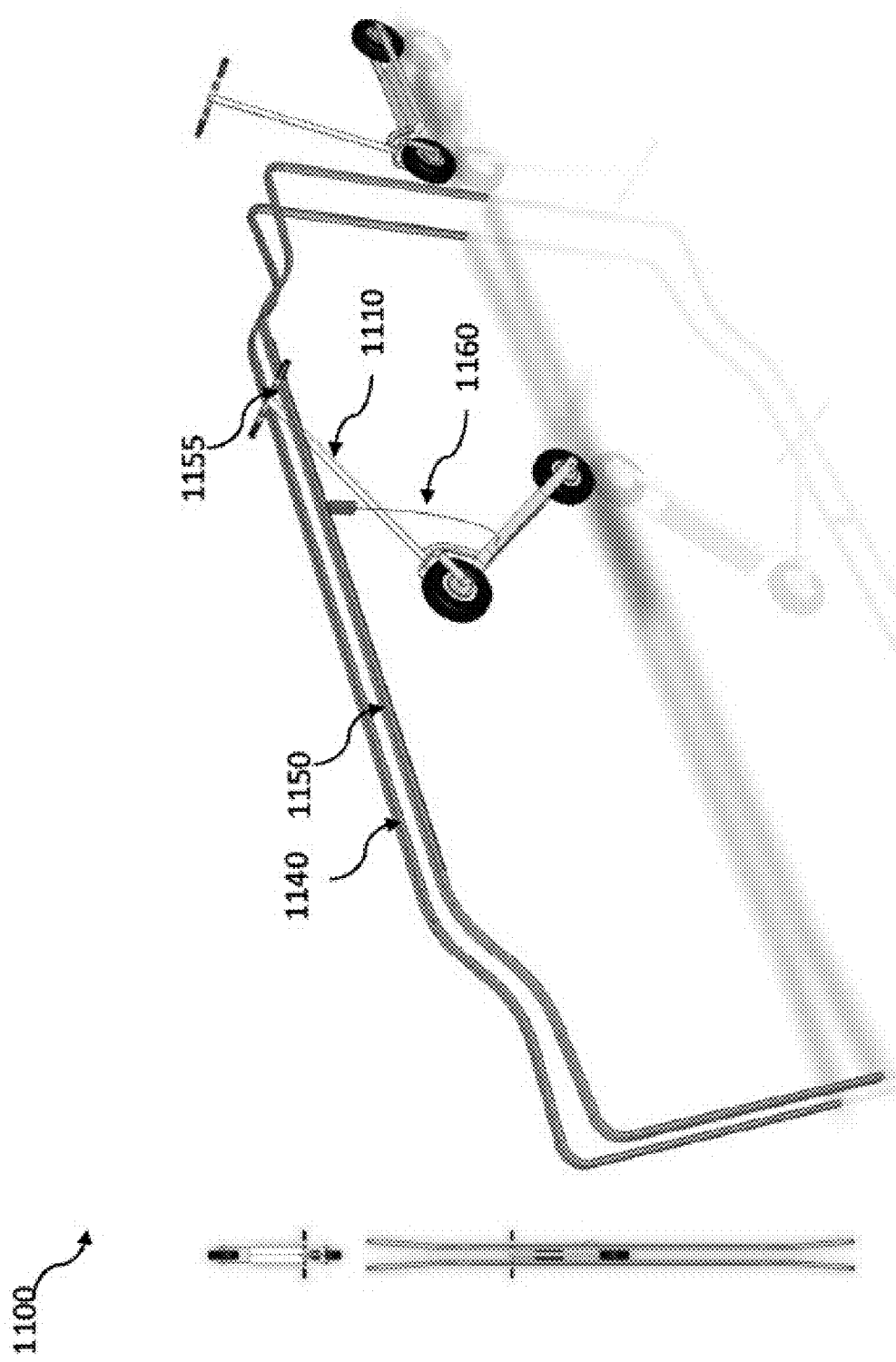
Figure 11C:
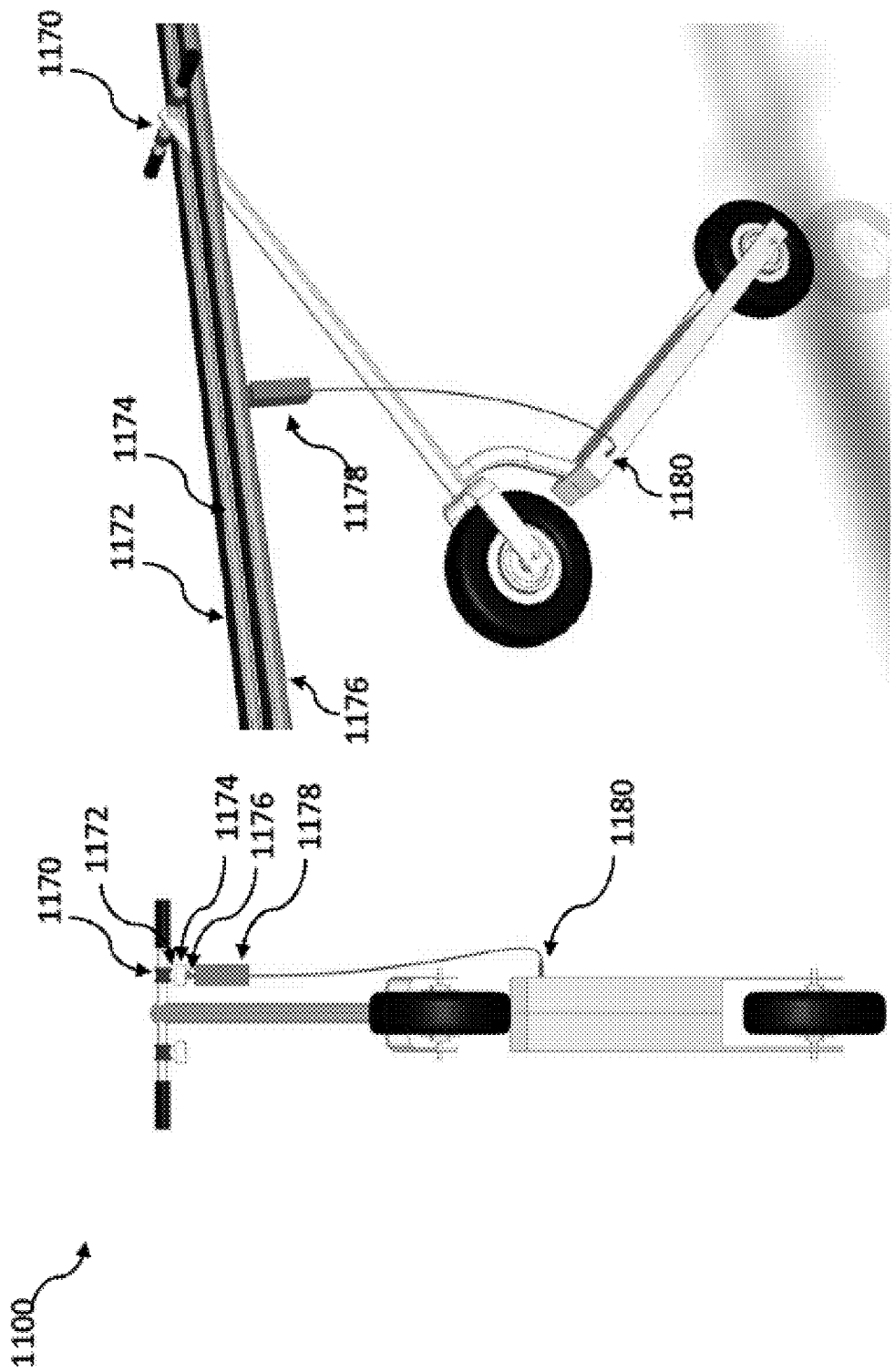

FIGS. 11A-11C are diagrams illustrating an electric scooter docking station having a handlebar coupling configuration. As shown in FIG. 11A, the docking station 1100 includes a handlebar rail or channel 1120, which facilitates the docking and movement of an electric scooter 1110 within the docking station 1100 via the handlebars of the scooter 1110. For example, the station 1100 utilizes the handlebars of the scooter 1110 as a charging, contacting, and/or sliding surface along the rail 1120. In such a configuration, a scooter is easily pushed (by a user) along the rail 1120 into place (or automatically using the scooter's own electric motors to propel the scooter forward along the rail 1120). When the scooter 1110 handlebar meets a rail ramp 1130 of the rail 1120, the scooter 1110 is elevated via the rail 1120, and the scooter can be efficiently and compactly stored within the station, as described herein.

FIG. 11B provides additional details. For example, the rail 1120 can include a guide rail 1140 or movement rail, as well as a charging rail 1150, which contacts a charging port 1155 of the scooter 1110 to charge the scooter 1110 when docked within the station 1100. In some cases, such as cases where a scooter does not include a charging port, the station 1100, via the charging rail 1140, facilitates charging of the scooter 1110 via a sliding charging cable 1160 that connects the scooter 1110 to the charging rail 1150.

FIG. 11C depicts the station 1100 when accommodating different scooters for docking and charging within the station. The station 1100 receives a scooter 1110 having a scooter handlebar charging port 1170, which contacts a charging connector 1172 provided by a charging rail 1174. The station 1100 also includes a sliding charging cable rail 1176, which receives (or provides) and contacts a sliding charging cable 1178 connected to a standard charging port 1180 (e.g., a plug) of the scooter 1110.

Figure 12A:
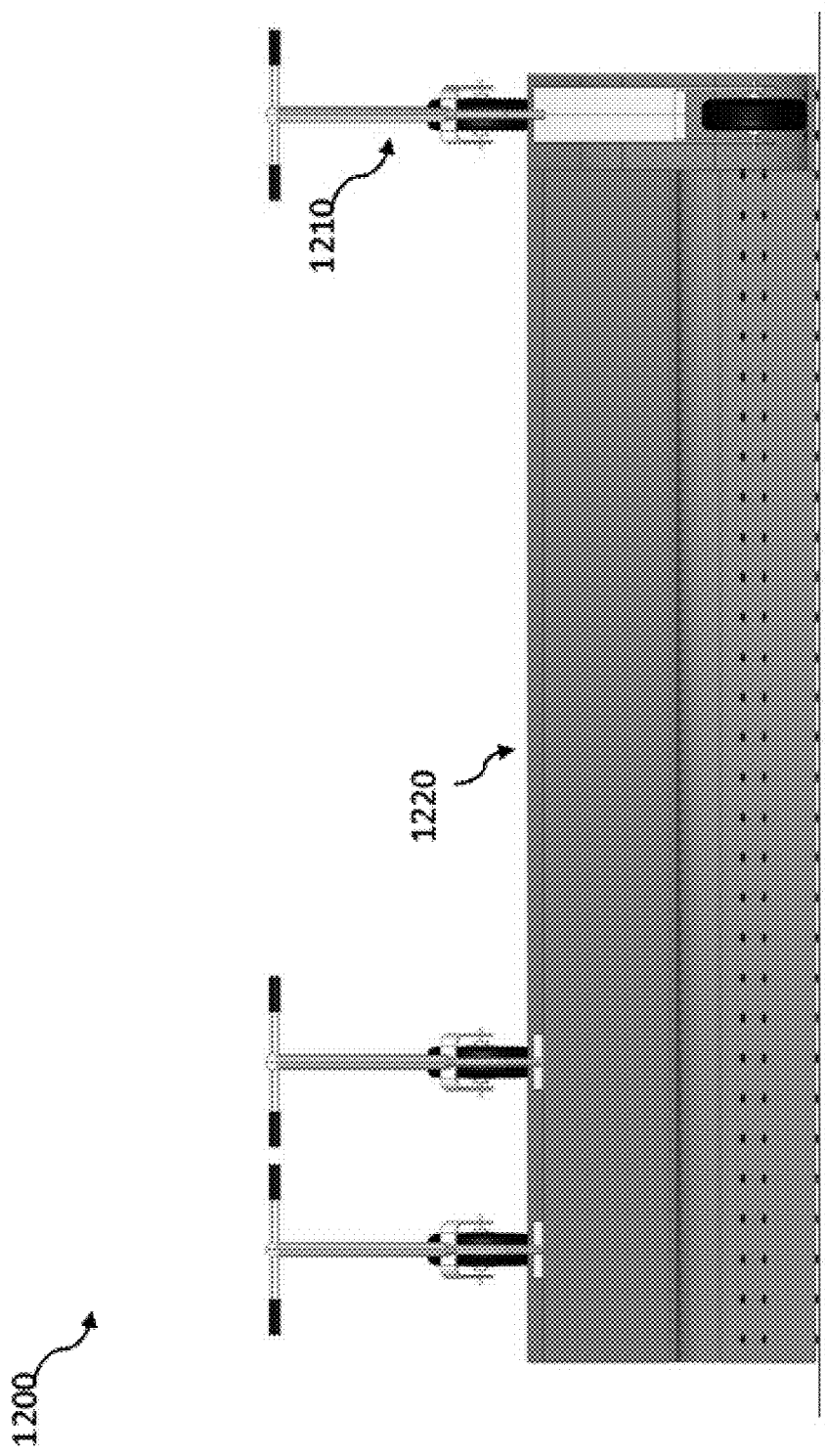
Figure 12B:
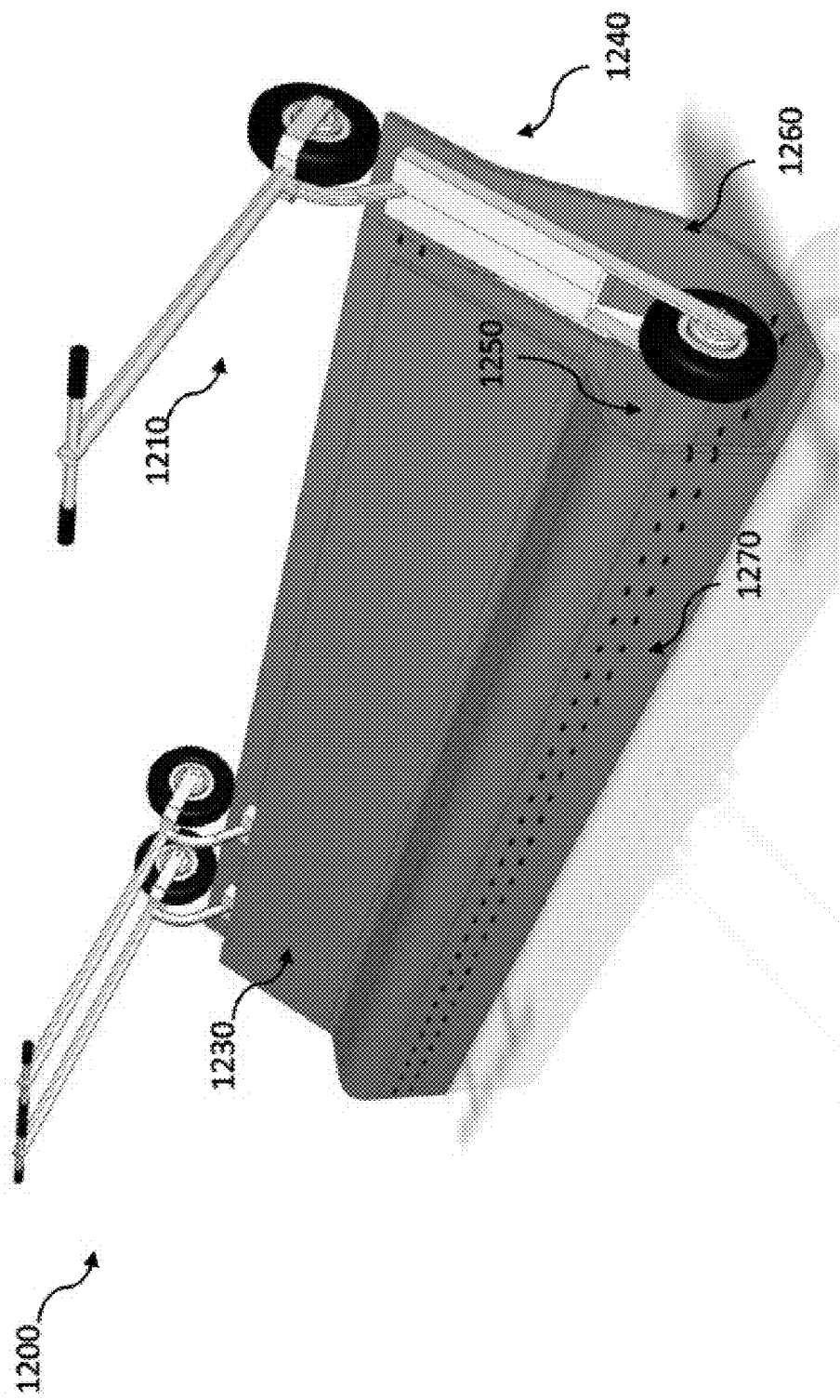

FIGS. 12A-12C are diagrams illustrating an electric scooter docking station 1200 having a sideways storage configuration.

As shown in FIG. 12A, the docking station 1200 provides lateral docking, movement, and/or storage of an electric scooter 1210 within a storage area 1220 provided by the station 1200. For example, the storage area 1220 is configured to facilitate the lateral sliding of the scooter 1210 within the station 1200.

FIG. 12B depicts a front portion 1230 and rear portion 1240 of the docking station 1200, which form a storage area 1250 via which the scooter 61210 enters and laterally moves within the station 1200. The scooter 1210 enters via an entry or access ramp 1260, and the station 1200 facilitates movement of the scooter 1210 via multiple rollers 1270 positioned to contact the wheels (or base) of the scooter 1210 at various points and roll the scooter 1210 laterally within the station 1200.

For example, as depicted in FIG. 12C, the electric scooter 1210 enters a storage area 1280 of the station 1200 via an access ramp 1285. Once positioned via the ramp 1285, the scooter 1210 can be pushed laterally within the station 1200, utilizing rollers 1290, which act as bearings and enable the sliding or rolling of the scooter within the storage area 1280 of the station 1200. The rollers 1290 can be positioned at various angles to allow the driven wheel motor to spin and drive the scooter 1210 sideways through the dock.

Thus, a docking station can be configured in a variety of ways in order to dock, store, and/or move electric scooters in a space efficient and useful manner, while also charging the scooters when docked within the docking station.

Further, as described herein, the disclosed technology can also include many different configurations of scooter removal components or portions for the docking stations. FIGS. 13A-13D are diagrams illustrating a method and apparatus for removing a scooter from a docking station.

Figure 13A:
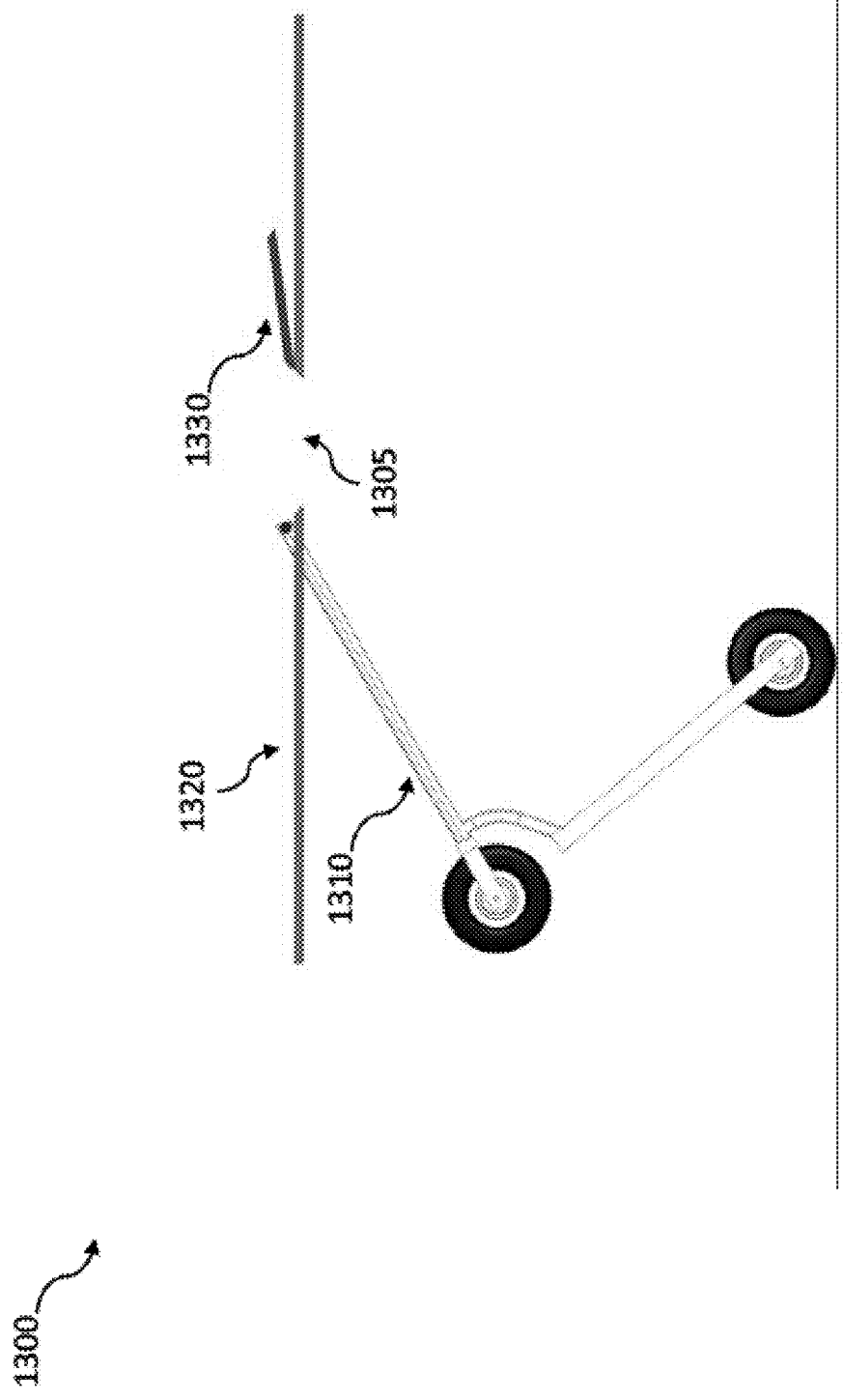

FIG. 13A depicts a docking station 1300 having an opening 1305 in or within a channel or rail portion 1320, such as those described herein. The station 1300 includes a moveable portion 1330 which can rotate or be removed to create the opening 1305 through which an electric scooter 1310 can be removed from the station. FIG. 13B also depicts the docking station 1300, where an opening 1305 is created or available to remove the scooter 1310 when one or more removable pieces 1330 are rotated or otherwise removed from the rails 1320.

Figure 13C:
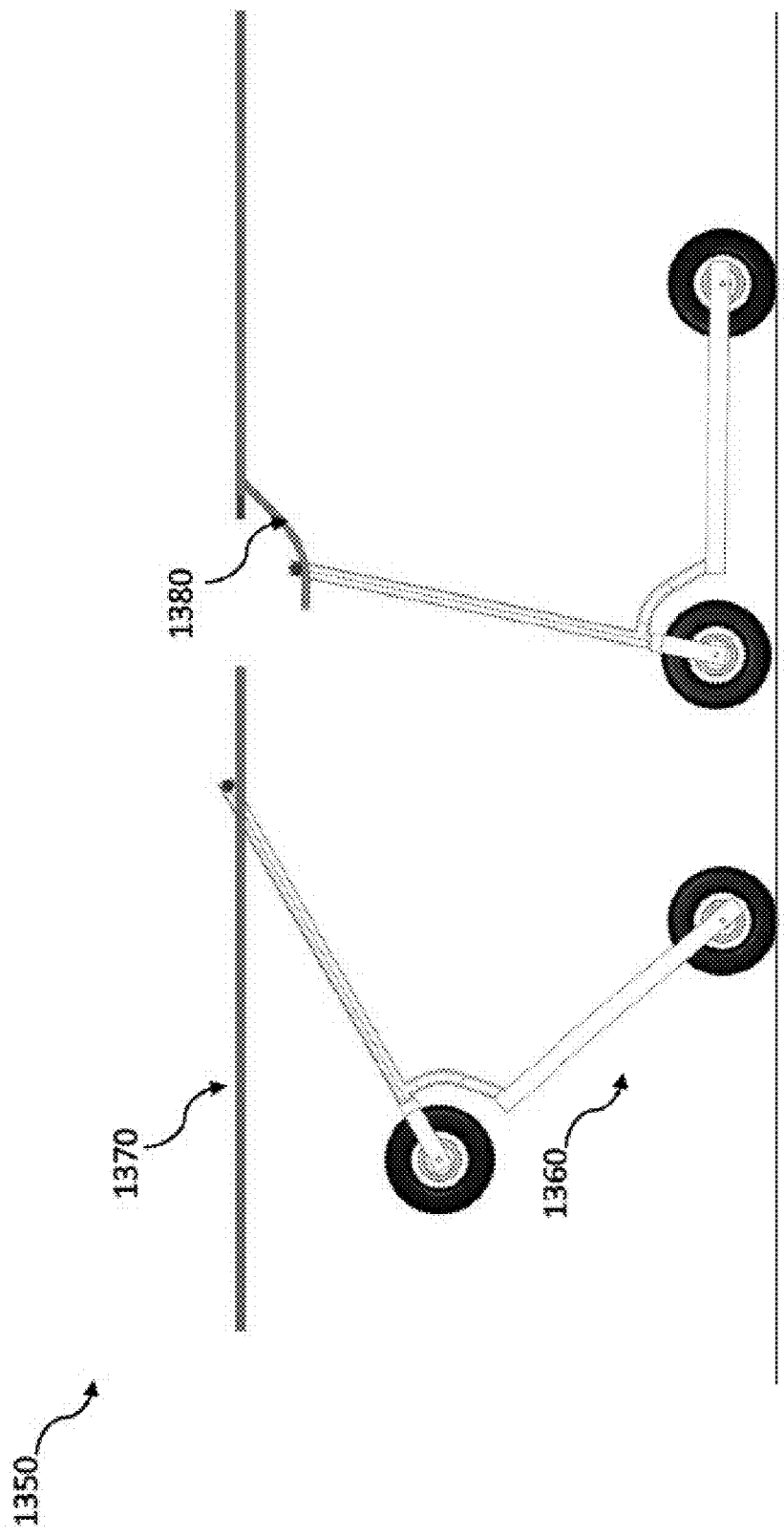
Figure 13D:
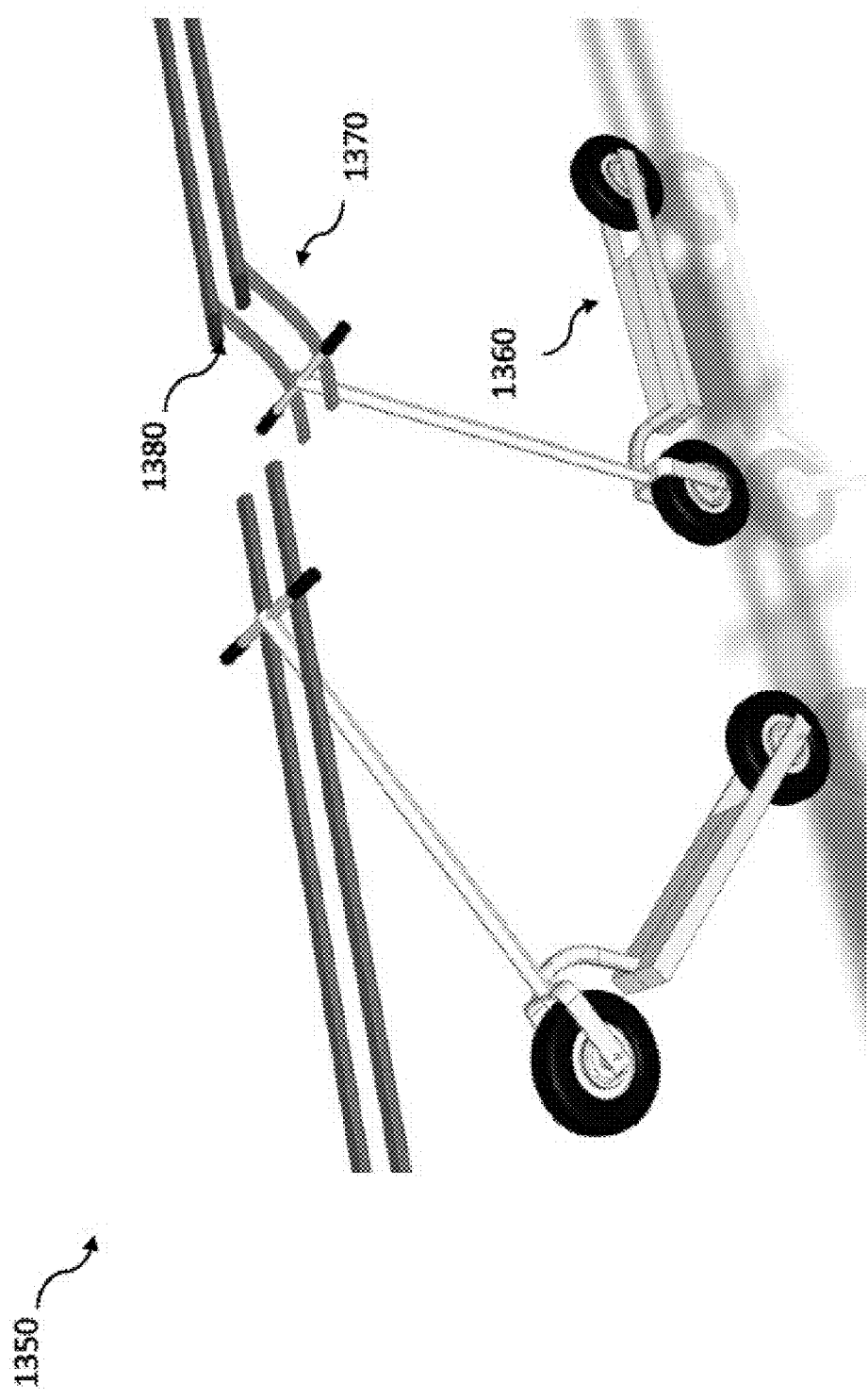

FIGS. 13C-13D illustrate an alternative method and apparatus for removing a scooter from a docking station. As depicted, a docking station 1350 stores an electric scooter 1360. When contained by the station 1350, the scooter 1360 is supported and moved along a rail or channel 1370. In order to remove the scooter 1360, the station 1350 provides a removal ramp or component 1380, which supports the scooter 1360 as it moves through an opening in the rail 1370 and is lowered down to the ground.

Example Embodiments of the Disclosed Technology

A docking station that dispenses electric scooters, the docking station comprising: an upper channel configured to receive a front wheel of an electric scooter; a lower channel configured to receive a rear wheel of the electric scooter, wherein the upper channel is positioned with respect to the lower channel in a configuration that stores electric scooters within the docking station at an angle with respect to the ground; and a charging rail that contacts a charging port of the electric scooter when the scooter is docked within the apparatus and provides charge to an electric battery of the electric scooter.

The upper channel can include a V-shaped groove configured to receive a guiding peg of the electric scooter and maintain a position the electric scooter proximate to the charging rail when the guiding peg is disposed within the V-shaped groove of the upper channel. The charging port can be part of a guiding peg of the electric scooter that is configured to maintain a position of the electric scooter proximate to the charging rail when the guiding peg is disposed within the upper channel or the lower channel.

The charging rail can be part of the upper channel of the docking station, the lower channel of the docking station, or both channels. The charging rail can include rolling contacts that are positioned on the charging rail to maintain contact with the charging port of the electric scooter as the electric scooters travels through the docking station. The charging rail can include a contact plunger that contacts a contact pad of the electric when the electric scooter is docked within the docking station.

The docking station can also include a Z-shaped exit section that facilitates the dispensing of the electric scooter out of the docking station, including a Z-shaped ramp that causes the scooter to move from an angled docked position to an exit position. Further, the docking station can include a cleansing section that cleanses handlebars of the electric scooter when the electric scooter is docked within the docking station.

An apparatus for docking multiple electric scooters at a location, the apparatus comprising: an upper channel configured to receive a front wheel of an electric scooter; a lower channel configured to receive a rear wheel of the electric scooter; wherein the upper channel is positioned with respect to the lower channel in order to store electric scooters at an angle with respect to the ground. The upper channel can have a hump or curved shape and the lower channel has a straight shape.

A method of dispensing an electric scooter to a user via a docking station that stores electric scooters, the method comprising: positioning multiple electric scooters within one or more channels of the docking station, wherein the one or more channels are configured to receive wheels of the electric scooters and provide charge to the electric scooters via charging rails within the one or more channels; and facilitating self-propelled movement of the multiple electric scooters within the one or more channels of the docking station from an entry portion of the docking station to an exit portion of the docking station.

The self-propelled movement of the multiple electric scooters within the one or more channels of the docking station from an entry portion of the docking station to an exit portion of the docking station can include rotating wheels of the electric scooters to provide opposing forces to one another and to grip the one or more channels of the docking station.

The self-propelled movement of the multiple electric scooters within the one or more channels of the docking station from an entry portion of the docking station to an exit portion of the docking station can include rotating wheels of the electric scooters to provide opposing forces to one another and grip the one or more channels of the docking station, such that the multiple electric scooters travel in a vertical direction within the docking station.

The one or more channels can provide charge to the electric scooters via rolling contacts positioned on the charging rails and configured to be coupled with contact pads of the electric scooters when the electric scooters travel within the docking station.

Positioning multiple electric scooters within one or more channels of the docking station can include providing charging rails having V-shaped grooves which facilitate reception of guiding pegs of the electric scooters when the electric scooters are positioned within the one or more channels of the docking station.

The method can include causing the multiple electric scooters to move through a cleansing area of the docking station that is located between the entry portion of the docking station and the exit portion of the docking station.

An electric scooter docking station, comprising: a rail that supports handlebars of scooters; and a charging component integrated to the rail and configured to provide charge to docked scooters when charging ports of the docked scooters contact the charging component. The rail can have a geometry that facilitates self-propelled movement of scooters supported by the rail towards an opening of the electric scooter docking station. The rail can have a geometry that facilitates self-propelled movement of scooters in a vertical direction within the electric scooter docking station. The rail can have multiple openings that facilitate removal of the scooters from the electric scooter docking station.

The charging component can be configured to transfer charge from the electric scooter docking station to the docked scooters when contact pads of the charging ports of the docked scooters maintain contact with the charging component as the docked scooters move through the electric scooter docking station.

Thus, in various embodiments, a docking station provides for efficient storage of electric scooters while also charging the scooters when docked within the docking station.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order; and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. A docking station that dispenses electric scooters, the docking station comprising:
    an upper channel configured to receive a front wheel of an electric scooter;
    a lower channel configured to receive a rear wheel of the electric scooter,
    wherein the upper channel is positioned with respect to the lower channel in a configuration that stores electric scooters within the docking station at an angle with respect to a ground upon which the docking station sits; and
    a charging rail that contacts a charging port of the electric scooter when the electric scooter is docked within the docking station and provides charge to an electric battery of the electric scooter.

2. The docking station of claim 1, wherein the upper channel includes a V-shaped groove configured to receive a guiding peg of the electric scooter and maintain a position the electric scooter proximate to the charging rail when the guiding peg is disposed within the V-shaped groove of the upper channel.

3. The docking station of claim 1, wherein the charging port is a part of a guiding peg of the electric scooter that is configured to maintain a position of the electric scooter proximate to the charging rail when the guiding peg is disposed within the upper channel or the lower channel.

4. The docking station of claim 1, wherein the charging rail is a part of the upper channel of the docking station.

5. The docking station of claim 1, wherein the charging rail is a part of the lower channel of the docking station.

6. The docking station of claim 1, wherein the charging rail includes rolling contacts that are positioned on the charging rail to maintain contact with the charging port of the electric scooter as the electric scooter travels through the docking station.

7. The docking station of claim 1, wherein the charging rail includes a contact plunger that contacts a contact pad of the electric scooter when the electric scooter is docked within the docking station.

8. The docking station of claim 1, further comprising:
a Z-shaped exit section that facilitates dispensing of the electric scooter out of the docking station, including a Z-shaped ramp that causes the electric scooter to move from an angled docked position to an exit position.

9. The docking station of claim 1, further comprising:
a cleansing section that cleanses handlebars of the electric scooter when the electric scooter is docked within the docking station.

10. A method of dispensing an electric scooter to a user via a docking station that stores electric scooters, the method comprising:
positioning multiple electric scooters within one or more channels of the docking station,
wherein the one or more channels are configured to receive wheels of the electric scooters and provide charge to the electric scooters via charging rails within the one or more channels; and
facilitating self-propelled movement of the multiple electric scooters within the one or more channels of the docking station from an entry portion of the docking station to an exit portion of the docking station.

11. The method of claim 10, wherein the self-propelled movement of the multiple electric scooters within the one or more channels of the docking station from an entry portion of the docking station to an exit portion of the docking station includes rotating wheels of the electric scooters to provide opposing forces to one another and to grip the one or more channels of the docking station.

12. The method of claim 10, wherein the self-propelled movement of the multiple electric scooters within the one or more channels of the docking station from an entry portion of the docking station to an exit portion of the docking station includes rotating wheels of the electric scooters to provide opposing forces to one another and grip the one or more channels of the docking station, such that the multiple electric scooters travel in a vertical direction within the docking station.

13. The method of claim 10, wherein the one or more channels provide charge to the electric scooters via rolling contacts positioned on the charging rails and configured to be coupled with contact pads of the electric scooters when the electric scooters travel within the docking station.

14. The method of claim 10, wherein positioning multiple electric scooters within one or more channels of the docking station includes providing charging rails having V-shaped grooves which facilitate reception of guiding pegs of the electric scooters when the electric scooters are positioned within the one or more channels of the docking station.

15. The method of claim 10, further comprising:
causing the multiple electric scooters to move through a cleansing area of the docking station that is located between the entry portion of the docking station and the exit portion of the docking station.

* * * * *